United States Patent
Zhang et al.

(10) Patent No.: US 8,000,060 B2
(45) Date of Patent: Aug. 16, 2011

(54) PERPENDICULAR MAGNETIC RECORDING MEDIUM AND SYSTEM HAVING A MAGNETIC RECORDING LAYER WITH A PERPENDICULAR RECORDING LAYER, A MAGNETIC COUPLING LAYER, AND A WRITING ASSIST LAYER

(75) Inventors: Zhengang Zhang, Kanagawa (JP); Ikuko Takekuma, Yokohama (JP); Kiwamu Tanahashi, Tokyo (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 733 days.

(21) Appl. No.: 12/009,415

(22) Filed: Jan. 17, 2008

(65) Prior Publication Data

US 2008/0180843 A1    Jul. 31, 2008

(30) Foreign Application Priority Data

Jan. 18, 2007    (JP) .................. 2007-009094

(51) Int. Cl.
*G11B 5/82* (2006.01)
(52) U.S. Cl. ........................................ 360/135
(58) Field of Classification Search .......... None
See application file for complete search history.

(56) References Cited

U.S. PATENT DOCUMENTS

| | | | | |
|---|---|---|---|---|
| 6,268,073 | B1 * | 7/2001 | Chen | ............... 428/825.1 |
| 6,893,746 | B1 | 5/2005 | Kirino et al. | |
| 2003/0096141 | A1 * | 5/2003 | Chen | ............... 428/694 ML |
| 2006/0166039 | A1 | 7/2006 | Berger et al. | |
| 2006/0177703 | A1 | 8/2006 | Takenoiri et al. | |
| 2006/0177704 | A1 | 8/2006 | Berger et al. | |
| 2006/0222901 | A1 * | 10/2006 | Inamura et al. | ............... 428/827 |
| 2007/0217071 | A1 * | 9/2007 | Inamura et al. | ............... 360/135 |

FOREIGN PATENT DOCUMENTS

| | | |
|---|---|---|
| JP | 2003-317221 A | 11/2003 |
| JP | 2006-048900 | 2/2006 |

OTHER PUBLICATIONS

Victoria et al. "Composite media for Perpendicular Magnetic Recording," IEEE Transactions on Magnetics 41:537-542 (Feb. 2005).

Wang et al. "Composite media (dynamic tilted media) for magnetic recording," Applied Physics Letters 86:142504:1-3 (Apr. 2005).

* cited by examiner

Primary Examiner — David D Davis
(74) Attorney, Agent, or Firm — Zilka-Kotab, PC

(57) ABSTRACT

Embodiments of the present invention provide a perpendicular magnetic recording medium having a substrate, a magnetic recording layer and a protective layer. The magnetic recording layer includes a perpendicular recording layer, a magnetic coupling layer and a writing assist layer. The perpendicular recording layer is a Co alloy layer containing an oxide disposed between the magnetic coupling layer and the substrate. The magnetic coupling layer is a ferromagnetic layer disposed between the perpendicular recording layer and the writing assist layer. The writing assist layer is a ferromagnetic layer disposed between the magnetic coupling layer and the protective layer. The saturation magnetization of the magnetic coupling layer is lower than the saturation magnetization of the perpendicular recording layer or the writing assist layer. The thickness of the magnetic coupling layer is 1 nm or more and 3 nm or less.

23 Claims, 15 Drawing Sheets

PERPENDICULAR MAGNETIC RECORDING MEDIUM AND SYSTEM HAVING A MAGNETIC RECORDING LAYER WITH A PERPENDICULAR RECORDING LAYER, A MAGNETIC COUPLING LAYER, AND A WRITING ASSIST LAYER

CROSS-REFERENCE TO RELATED APPLICATION

The instant nonprovisional patent application claims priority to Japanese Patent Application No. 2007-009094 filed Jan. 18, 2007 and which is incorporated by reference in its entirety herein for all purposes.

BACKGROUND OF THE INVENTION

A hard disk drive (HDD) is an essential information storage apparatus in computers and various consumer electronics products, particularly, for large capacity information storage application. The magnetic recording method is basically classified into two types of technical methods, one being longitudinal magnetic recording (LMR) and the other being perpendicular magnetic recording (PMR), depending on the direction of the magnetization vector in the magnetic recording layer of a magnetic recording medium. In recent years, it has been found that the longitudinal magnetic recording method has the recording density limit at about 100 Gb/in$^2$ and the longitudinal magnetic recording method has being shifted to the perpendicular magnetic recording method in a magnetic recording hard disk drive. The advantage of the perpendicular magnetic recording method over the longitudinal magnetic recording method has been demonstrated by the attainment of the recording surface density above 300 Gb/in$^2$.

Japanese Patent Publication No. 2006-48900 ("Patent Document I") discloses a perpendicular magnetic recording medium having a first magnetic recording layer and a second magnetic recording layer ferromagnetically coupled to each other while sandwiching a coupling layer 6 therebetween. The coupling layer has any one of elements V, Cr, Fe, Co, Ni, Cu, Nb, Mo, Ru, Rh, Ta, W, Re, and Ir as a main ingredient and has a film thickness of preferably 2 nm or less. Patent Document 1 further describes that the ferromagnetic materials, Fe, Co, Ni can also obtain a coupling energy more suitable to the adjustment of alloying with a non-magnetic material, deposition condition, or deposition atmosphere. Further, it is described that the ferromagnetic coupling can also be obtained in the case of using Pd or Pt, but the anisotropic energy increases at the boundary between the coupling layer and the magnetic recording layer in the case of using Pd or Pt which is not suitable since this results increase the switching field.

According to the inventors, it is necessary that the perpendicular recording medium for a writing head with a shield on the rear end (trailing shield (TS) type head) has a relatively low medium saturation field (Hs) in order to maintain an appropriate overwrite (OW) level. According to the Stoner-Wholfarth (S-W) coherent magnetization rotational reversal model, the reversal field of the medium is inherently determined by the magnetic anisotropy energy density Ku. As Ku of the magnetic grain is decreased, the switching field is decreased. However, the medium thermal stability factor $KuV/K_BT$ (where V represents a thermal activation volume, $K_B$ represents a Boltzman constant, and T represents a temperature) is also a value which is determined being inherently related to Ku, and it is necessary that $KuV/K_BT$ is at least 60 in order to keep the recorded magnetic bit stably for 10 years. Thus, a question arises on how to obtain good thermal stability and medium writing performance simultaneously.

In the case of using an exchange-sprint medium where a soft magnetic layer and a hard magnetic layer are exchange-coupled to each other much improved writing performance can be obtained. In such an exchange-spring medium, the coupling layer plays an important role to enhance the exchange-spring effect. In the case where the vertical coupling is too weak, since the hard magnetic layer and the soft magnetic layer rotate separately, the magnetic reversal of the hard magnetic layer is not supported sufficiently by the soft magnetic layer.

None of the above-mentioned documents define the range of the saturation magnetization for the material of the coupling layer. Further, the optimal value for the thickness of the coupling layer is less than 1 nm in each of the examples. Since the recording properties of the medium utilizing the exchange-spring effect vary greatly depending on the thickness of the coupling layer, stable recording properties can scarcely be maintained in the case of mass producing such exchange-spring media.

BRIEF SUMMARY OF THE INVENTION

Embodiments of the present invention provide a perpendicular magnetic recording medium having an improved writing property due to the exchange spring effect and capable of stable production. According to one embodiment, a perpendicular magnetic recording medium includes a substrate, a magnetic recording layer and a protective layer. The magnetic recording layer includes a perpendicular recording layer, a magnetic coupling layer and a writing assist layer. The perpendicular recording layer is a Co alloy layer containing an oxide disposed between the magnetic coupling layer and the substrate. The magnetic coupling layer is a ferromagnetic layer disposed between the perpendicular recording layer and the writing assist layer. The writing assist layer is a ferromagnetic layer disposed between the magnetic coupling layer and the protective layer. The saturation magnetization of the magnetic coupling layer is lower than the saturation magnetization of the perpendicular recording layer or the writing assist layer. The thickness of the magnetic coupling layer is 1 nm or more and 3 nm or less.

DETAILED DESCRIPTION OF THE INVENTION

Figure 1:
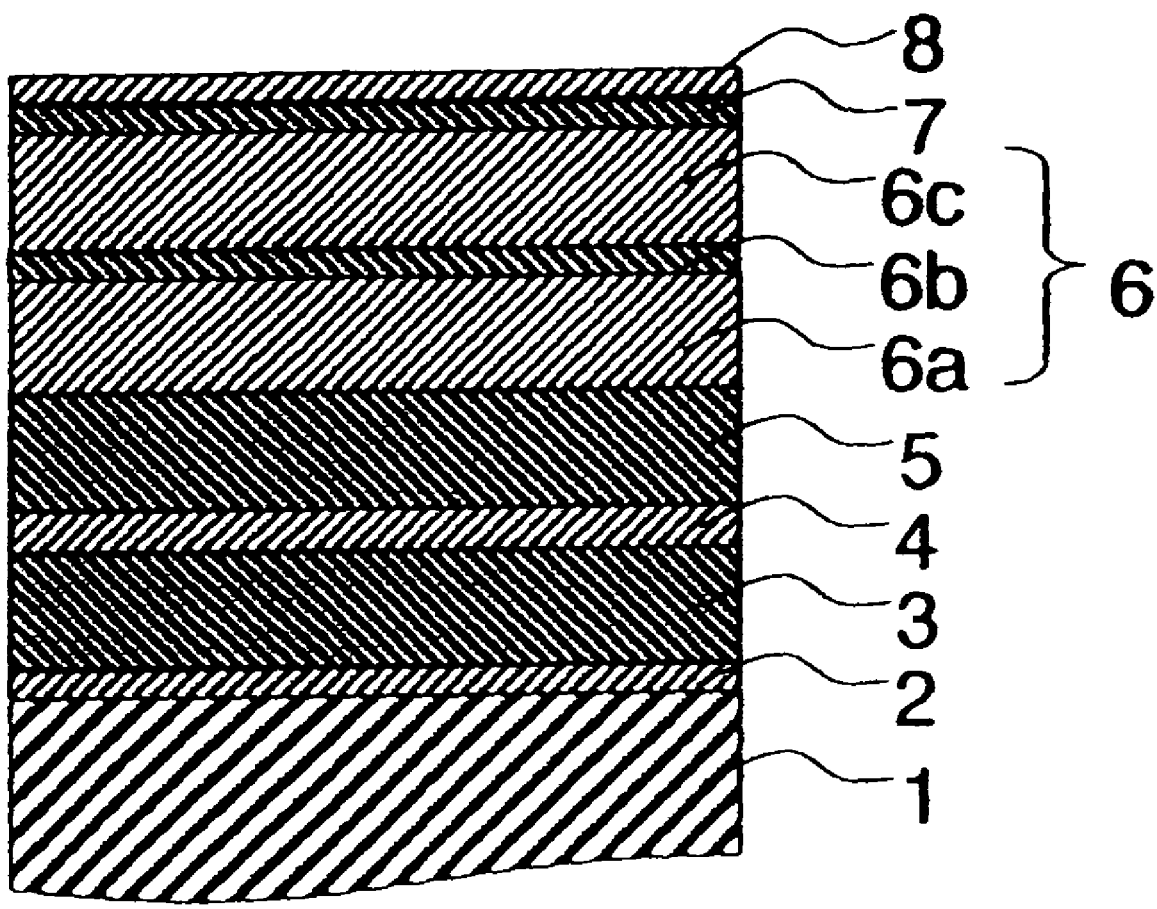
FIG. 1 is a view showing a layer constitution of a perpendicular magnetic recording medium according to an embodiment of the invention.

Embodiments of the present invention relate to a perpendicular magnetic recording medium and a hard disk drive using the same. Embodiments of the invention provide a perpendicular magnetic recoding medium capable of stable production and having high writing performance by sufficiently attaining an exchange-spring effect not using an extremely thin (less than 1 nm) coupling layer.

Typical examples disclosed in the present specification are summarized as below.

A perpendicular magnetic recoding medium including a non-magnetic substrate, an adhesion layer, a soft magnetic underlayer, a seed layer, an intermediate layer, a magnetic recoding layer, a protective layer, and a lubrication layer in which: the magnetic recording layer at least including a perpendicular recoding layer, a writing assist layer, and a magnetic coupling layer disposed between the perpendicular recording layer and the writing assist layer; the magnetic coupling layer is a ferromagnetic layer constituted with a magnetic material having saturation magnetization lower than the saturation magnetization of the writing assist layer and lower than the saturation magnetization of the perpendicular recording layer; and the thickness of the magnetic coupling layer is 1 nm or more and 3 nm or less.

In embodiments of the invention, a magnetic coupling layer 6b is formed by using a magnetic layer with a low saturation magnetization Ms. According to the magnetic theory, in a stacked two magnetic layers, the exchange coupling field that a layer 1 receives from an adjacent layer 2 can be represented by the following equation (1).

$$H1 = Jex(Ms_1, Ms_2)V_1V_2/(Ms_1V_1) \quad (1)$$

In the formula (1) above, Jex represents an exchange coupling energy density at the boundary, which is a value proportional to magnetization values $Ms_1$ and $Ms_2$ of the layer 1 and the layer 2 described above. Further, $V_1$ and $V_2$ represent, respectively, the volumes for the layer 1 and the layer 2 described above. The formula (I) shows that the coupling field at the boundary is weakened by the magnetic layer of low saturation magnetization Ms. In the case of inserting a magnetic layer with low saturation magnetization Ms between two magnetic layers having large saturation magnetization Ms, Jex can be decreased effectively, and the coupling strength can be adjusted by the thickness of the magnetic layer with low saturation magnetization Ms. Compared with a non-magnetic material, in the case of using the magnetic material with low saturation magnetization Ms, an optimal thickness of the magnetic layer for obtaining the best writing and reading performances may be much thickener.

In the case of using the perpendicular magnetic recording medium prepared based on embodiments of the invention, since an effective exchange spring effect can be obtained by using a coupling layer having a thickness of 1 nm or more, a perpendicular magnetic recording medium of high writing performance capable of stable production can be provided. This enables to produce a perpendicular magnetic recording medium capable of attaining high density magnetic recording.

Embodiments of the invention will be explained with reference to the drawings. FIG. 1 shows a perpendicular magnetic recording medium of embodiments of the invention in cross sectional view. A medium shown in FIG. 1 includes a non-magnetic substrate 1, an adhesion layer 2, a soft magnetic underlayer 3, a seed layer 4, an intermediate layer 5, a magnetic recording layer 6 at least including a perpendicular recording layer 6a, a writing assist layer 6c, and a magnetic coupling layer 6b disposed between the perpendicular recording layer 6a and the writing assist layer 6c, a protective layer 7, and a lubrication layer 8.

As the non-magnetic substrate 1, a metal substrate formed of a metal material such as an aluminum alloy can be used, and a non-metal substrate formed of a non-metal material such as glass, ceramic, silicon, silicon carbide, and carbon may also be used.

The function of adhesion layer 2 is to enhance the adhesion force between the substrate 1 and the layer disposed on the adhesion layer 2. The adhesion layer 2 is formed of one or more elements selected from Al, Cr, Ti, Ni, Ta, and Zr. The layer 3 is a soft magnetic underlayer, and the function thereof is to enhance the magnetic field from the head flying above the medium. The soft magnetic underlayer can be formed of a Co alloy, Fe alloy, or Ni alloy and contains one or more elements selected from Ta, Zr, B, Nb, V, Mo, Cr, Si, Al, Ti, O, Cu, P, C, and N. The soft magnetic underlayer can be amorphous or in a microcrystalline structure.

In order to remove the spike noise from the soft magnetic underlayer 3, the soft magnetic underlayer 3 preferably has an anti-ferromagnetically coupled sandwich structure, where an interlayer of Ru or Ru-alloy layer is inserted between the two soft magnetic layers. In the anti-ferromagnetically coupled soft magnetic underlayer, the two soft layers have an anti-parallel orientation for their magnetization under a zero magnetic field and have a parallel orientation under a head magnetic field.

The product Bs·t for the saturation magnetization density Bs and the thickness t of the soft magnetic underlayer 3 can be from 0 to 300 T·nm. The optimal value for Bs·t varies depending on the head type, the magnetic property of the medium, and the magnetic property of the soft magnetic underlayer. In the case where the recording head has a high writing magnetic field and the medium has a quite low saturation magnetic field, the soft magnetic underlayer can even be eliminated completely. However, in most cases, when the saturation magnetic flux density of the soft magnetic underlayer 3 is about 1T, the optimal thickness of the soft magnetic underlayer 3 is 20 nm or more and 100 nm or less.

On the soft magnetic underlayer 3, the seed layer 4 is disposed. The seed layer 4 is a layer having a function of improving the crystal orientation of the intermediate layer 5. The seed layer 4 may be amorphous or have a face-centered cubic crystal structure. The material used for the seed layer contains one or more elements selected from Ta, Ni, Cr, Ti, Fe, W, Co, Pt, Pd, and C. In the case of using the seed layer having the face-centered crystal structure, an intermediate layer comprising a material having a hexagonal close-packed (hcp) crystal stricture is epitaxially grown above the seed layer and the c-axis is oriented in the direction perpendicular to the film surface preferably. The thickness of the seed layer 4 is preferably 0.5 nm or more and 10 nm or less. In the case where the thickness of the seed layer 4 exceeds 10 nm, the grain size of the recording layer is excessively large resulting in lowering of the writing and reading performances of the medium.

The intermediate layer 5 is disposed on the seed layer 4. The intermediate layer 5 is a layer having a function of controlling the c-axis orientation and the grain size of the magnetic recording layer 6. As the material used for the intermediate layer 5, a material having a hexagonal close-packed (hcp) crystal structure is used and, for example, an Ru alloy, Co alloy, or Pt alloy is used. By epitaxial growing of the magnetic recoding layer 6 above the intermediate layer 5, the c-axis of the magnetic recoding layer 6 is oriented in the direction perpendicular to the film surface.

The c-axis orientation of both the intermediate layer 5 and the magnetic recoding layer 6 can be detected by X-ray diffraction. The full width at half magnitude (FWHM) of a locking curve represents the degree of the c-axis orientation. As the value for the full width at half magnitude increases, this means increase in the variation of the c-axis in which the reversal magnetic field distribution of the perpendicular magnetic recording medium is widened to result in lowering of the writing and reading performances. For obtaining good writing and reading performances, it is preferred that the full width at half magnetic (FWHM) is less than 4°.

The thickness of the intermediate layer 5 is preferably 0.5 nm or more and 40 nm or less and, more preferably, 5 nm or more and 20 nm or less. In the case where the thickness of the intermediate layer 5 is less than 5 nm, it is sometimes difficult to set the c-axis orientation such that the full width at half magnitude is less than 4°. Further, it is sometimes difficult to have a good compositional segregation in the recoding layer. In the case where the thickness of the intermediate layer 5 is more than 20 nm, the grain size of the recording layer may sometimes increase excessively and, further, the distance between the recording head and the soft magnetic underlayer sometimes increases excessively and the writing and reading performances may sometimes be lowered due to the effect of both of them.

In order that the magnetic recording layer 6 disposed on the intermediate layer 5 has a relatively high coercivity, it is necessary to increase an Ar gas pressure higher upon film deposition of the intermediate layer 5 (higher than 3 Pa). The surface state of the intermediate layer 5 deposited under the presence of a high Ar gas pressure is suitable to promotion of the compositional segregation for the magnetic recording layer 6. However, for setting the c-axis orientation such that the full width at half magnitude of the c-axis orientation to 4° or less, it is preferred to lower the Ar gas pressure upon deposition of Ru. For satisfying both good perpendicular orientation for the c-axis of the recoding layer (orientation in the direction perpendicular to the film surface) and good compositional segregation, a method of depositing Ru in a two stage can be used. Specifically, an Ru portion disposed on the lower side is deposited at a low Ar gas pressure (lower than 2 Pa), while an Ru portion disposed on the upper side is deposited at a high Ar gas pressure (higher than 3 Pa). The thickness for the Ru portion on the lower side and the Ru portion for the upper side can be set, for example, to an identical thickness.

As shown in FIG. 1, the magnetic recording layer comprises three stacked layers, that is, the perpendicular recording layer 6a, the magnetic coupling layer 6b, and the writing assist layer 6c.

The perpendicular recording layer 6a has a perpendicular coercivity more than 318 kA/m (4 kOe). The perpendicular recording layer 6a can be formed by adding an oxide to a Co—Cr—Pt alloy. The grain segregation can be improved by the addition of the oxide and, as a result, a fine granular structure having an oxide rich grain boundary can be formed. As the oxide $CrO_x$, $SIO_x$, $TaO_x$, $AIO_x$, $TiO_x$, and $MgO_x$ can be used, for example. The content of the oxide in the perpendicular recording layer 6a is preferably 3 mol % or more and 12 mol % or less.

In the case where the content of the oxide in the perpendicular recording layer 6a is less than 3 mol %, magnetic grains are not sufficiently isolated by the oxide grain boundary giving a strong exchange coupling between the magnetic grains, and, as a result, medium noise may be increased sometimes. Further, in the case where the content of the oxide in the perpendicular recording layer 6a is more than 12 mol %, a portion of the oxide may sometimes intrude to the inside of the magnetic particles to result in lowering the magnetic property of the magnetic particles.

The Cr content in the perpendicular recording layer 6a can be 10% or more and 22% or less by at %. Further, the Pt content in the perpendicular recording layer 6a can be 10% or more and 20% or less by at %. As the Cr content in the perpendicular recording layer 6a increases, the particle segregation becomes favorable but this lowers saturation magnetization Ms and Ku. Ku is a value in proportion with the Pt content. Further, the Pt content should be properly determined in accordance with the recording performance of a recording head to be used. As the Pt content increases to more than 20% by at %, face-centered cubic phase begins to appear and Ku no more increases even when the amount of Pt increases.

In addition to Co, Cr, Pt and the oxides in the inside of the perpendicular recording layer 6a, other elements such as Ta, B, Mo, Cu, etc. can be added to the perpendicular recording layer 6a. By the addition of the elements, it is possible to control the magnetic property such as saturation magnetization, promote the grain boundary segregation, and improve the perpendicular orientation of c-axis.

The perpendicular recording layer 6a has a columnar structure comprising a plurality of crystal grains grown in the direction perpendicular to the film surface, and the grain size of the perpendicular recording layer 6a observed on a plane parallel with the film surface is preferably 5 nm or more and 15 nm or less. In the case where the grain size is less than 5 nm, the thermal stability sometimes become insufficient. In the case where the grain size is 15 nm or more, noises sometimes increase excessively. The grain size of the magnetic recoding layer can be measured, for example, by a transmission type electron microscope (TEM).

The magnetic coupling layer 6b is a layer for controlling the magnetic coupling between the perpendicular recording layer 6a and the writing assist layer 6c to an appropriate strength. The magnetic coupling layer 6b is a magnetic layer of low saturation magnetization and the saturation magnetization thereof is lower than the saturation magnetization of the writing assist layer 6c and lower than the saturation magnetization of the perpendicular recording layer 6a. The value for the saturation magnetization Ms of the magnetic coupling layer 6b is, preferably, 300 kA/m (300 emu/cc) or less and, more preferably, 100 kA/m (100 emu/cc) or more and 300 kA/m (300 emu/cc) or less. It can be confirmed that the exchange spring effect is improved by decreasing the saturation magnetization Ms of the magnetic coupling layer 6b inserted between the perpendicular recording layer 6a and the writing assist layer 6c.

For obtaining epitaxial growing between the perpendicular recording layer 6a and the magnetic coupling layer 6b, the magnetic coupling layer 6b can be formed of a Co—Cr alloy having a hexagonal close packed (hcp) crystal structure. By using not a non-magnetic layer but a magnetic layer for the magnetic coupling layer 6b, an optimal incoherent rotation can be obtained by the strong exchange spring effect at a thickness of an optimal magnetic recording layer well exceeding 1 nm. In the case where the magnetic coupling layer 6b is constituted with a non-magnetic material, magnetic coupling between the perpendicular recording layer and the writing assist layer has an extremely large effect on the thickness of the coupling layer 6b and the optimal thickness is decreased to less than 1 nm. As a result, even when exchange spring media are mass produced, stable magnetic property can scarcely be obtained.

In addition to Co and Cr, the magnetic coupling layer 6b can contain one or more elements selected from Pt, B, Mo, Ta, V, Nb, and Ru. Such elements can control the lattice constant of the magnetic coupling layer 6b and can improve the lattice matching between each of the perpendicular recording layer 6a, the magnetic coupling layer 6b, and the writing assist layer 6c. For controlling the saturation magnetization Ms of the magnetic coupling layer to more than 0 kA/m (0 emu/cc) and 300 kA/m (300 emu/cc) or less, total content of such elements is preferably 10% or less by at %. The amount of Co in the magnetic coupling layer 6b is preferably 70% or more and 75% or less by at %. Within the range described above, the value for the saturation magnetization of an alloy comprising Co and Cr as the main ingredient can be in a range from 0 to 300 kA/m and a favorable writing/reading characteristic can be attained at a thickness exceeding 1 nm.

Further, the magnetic coupling layer 6b may also contain oxides such as $CrO_x$, $SiO_x$, $TaO_x$, $AlO_x$, $TiO_x$, and $MgO_x$. By the addition of the oxides to the magnetic coupling layer 6b, a granular structure of the magnetic coupling layer 6b can be formed. In the case where the magnetization or the film thickness of the magnetic coupling layer is increased excessively, a phenomenon that the medium noise increases at a high linear recording density of 59 kfr/mm (1500 kFCI) or more was observed. However, by the addition of the oxide to the magnetic coupling layer, increase of the exchange coupling in the film surface was suppressed to suppress the increase in the medium noise at a high linear recording density. Particularly, in the case of adding $SiO_x$ (silicon oxide), $TaO_x$ (tantalum oxide), or $TiO_x$ (titanium oxide), the trend is remarkable and this is preferred. For controlling the saturation magnetization Ms of the magnetic coupling layer to higher than 0 kA/m (0 emu/cc) and 300 kA/m (300 emu/cc) or less, the content of the oxides is preferably 10% or less by mol %.

The thickness of the magnetic coupling layer 6b is an important factor to affect the magnetization reversal process and the medium recording performance. In the case where the magnetic coupling layer 6b is excessively thin, coupling in the perpendicular direction becomes too strong and gives more coherent rotation to the writing assist layer and the perpendicular recording layer. In the case where the magnetic coupling layer 6b is excessively thick, magnetic reversion occurs separately in the writing assist layer and the perpendicular recording layer. In both of the cases, sufficient exchange spring effect can no more be obtained. Only in the case where the thickness of the coupling layer is at an optimal value, best exchange spring effect is obtained, and the medium saturation magnetization has a minimum value for the thickness of the magnetic coupling layer 6b. The optimal value for the thickness of the magnetic coupling layer depends on the value for the saturation magnetization Ms of the magnetic coupling layer 6b and, further, also depends on the value for the saturation magnetization Ms of the writing assist layer 6c. Since the recording resolution is degraded in the case where the magnetic coupling layer is too thick, the thickness of the magnetic coupling layer is preferably set to 1 nm or more and 3 nm or less.

The writing assist layer 6c is a ferromagnetic layer magnetically coupled by way of the magnetic coupling layer 6b with the perpendicular recording layer 6a and also has a role of assisting the magnetization reversal of the perpendicular recording layer by the exchange spring effect. The perpendicular coercivity of the writing assist layer 6c in the case of not having magnetic coupling with the perpendicular recording layer 6a by way of the magnetic coupling layer 6b is preferably 239 kA/m (3 kOe) or less. In the case where the perpendicular coercivity is more than 239 kA/m (3 kOe), the effect of assisting the magnetization reversal of the perpendicular recording layer can no more be obtained. The writing assist layer 6c can be formed of a Co—Cr—Pt alloy having a hexagonal close packed (hcp) crystal structure and preferably contains no oxide. In the case where the oxides are not contained in the writing assist layer 6c, uniform lateral exchange coupling in the writing assist layer 6c can narrow the switching field distribution of the medium and, as a result, can obtain a good SN ratio. Also with a view point of the medium reliability, a medium external material not containing the oxide is preferred since it gives a good anti-corrosion property.

The value for the saturation magnetization Ms of the writing assist layer 6c is preferably larger than the value for the saturation magnetization Ms of the magnetic coupling layer 6b and can be set within a range of 300 kA/m or more and 1000 kA/m or less. In the case where the saturation magnetization of the writing assist layer 6c is lower than the saturation magnetization of the magnetic coupling layer 6b, the magnetization rotation of the perpendicular recording layer 6a can no more be assisted effectively by the writing assist layer 6c. Medium writability is in proportion to the saturation magnetization Ms of the writing assist layer 6c but, in the case where the saturation magnetization increases excessively, the medium noises increase. For compatibilizing the medium writability and low noise property, the saturation magnetization of the writing assist layer 6c is preferably 350 kA/m or more and 550 kA/m or less. It is preferred that the product of the saturation magnetization and the thickness of the perpendicular recording layer 6a is larger than the product of the saturation magnetization and the thickness of the magnetic coupling layer 6b, and the product of the saturation magnetization Ms and the thickness of the magnetic coupling layer 6b is smaller than the product of the saturation magnetization and the thickness of the writing assist layer 6c.

The writing assist layer 6c can contain, in addition to Co, Cr and Pt, one or more elements selected from B. Ta, Mo, Cu, Nd, W, Nb, Sm, Tb, Ru, and Re. Such elements can promote the grain segregation and improve the perpendicular orientation of c-axis. The content of the elements in the writing assist layer 6c is preferably less than 15% by at %. In the case where the content is more, the hexagonal close packed (hcp) crystal structure may sometimes be destroyed. The Pt content in the writing assist layer 6c is preferably 0% or more and 20% or less by at %. In the case where the Pt content is more, the face-centered cubic phase begins to appear in the writing assist layer 6c. Within the range of the Pt content described above, when the Pt content increases, this tends to increase a medium nucleation magnetic field Hn which is the magnetic field in which magnetization starts to reverse in the opposite direction in a hysteresis loop. As Hn increases, the thermal stability of the medium is enhanced.

The thickness of the writing assist layer 6c is preferably 1 nm or more and 10 nm or less. The thickness of the writing assist layer 6c should be optimized depending on the kind of the recording head or the thickness of the soft magnetic underlayer for obtaining an appropriate writability (overwriting performance).

Figure 3:
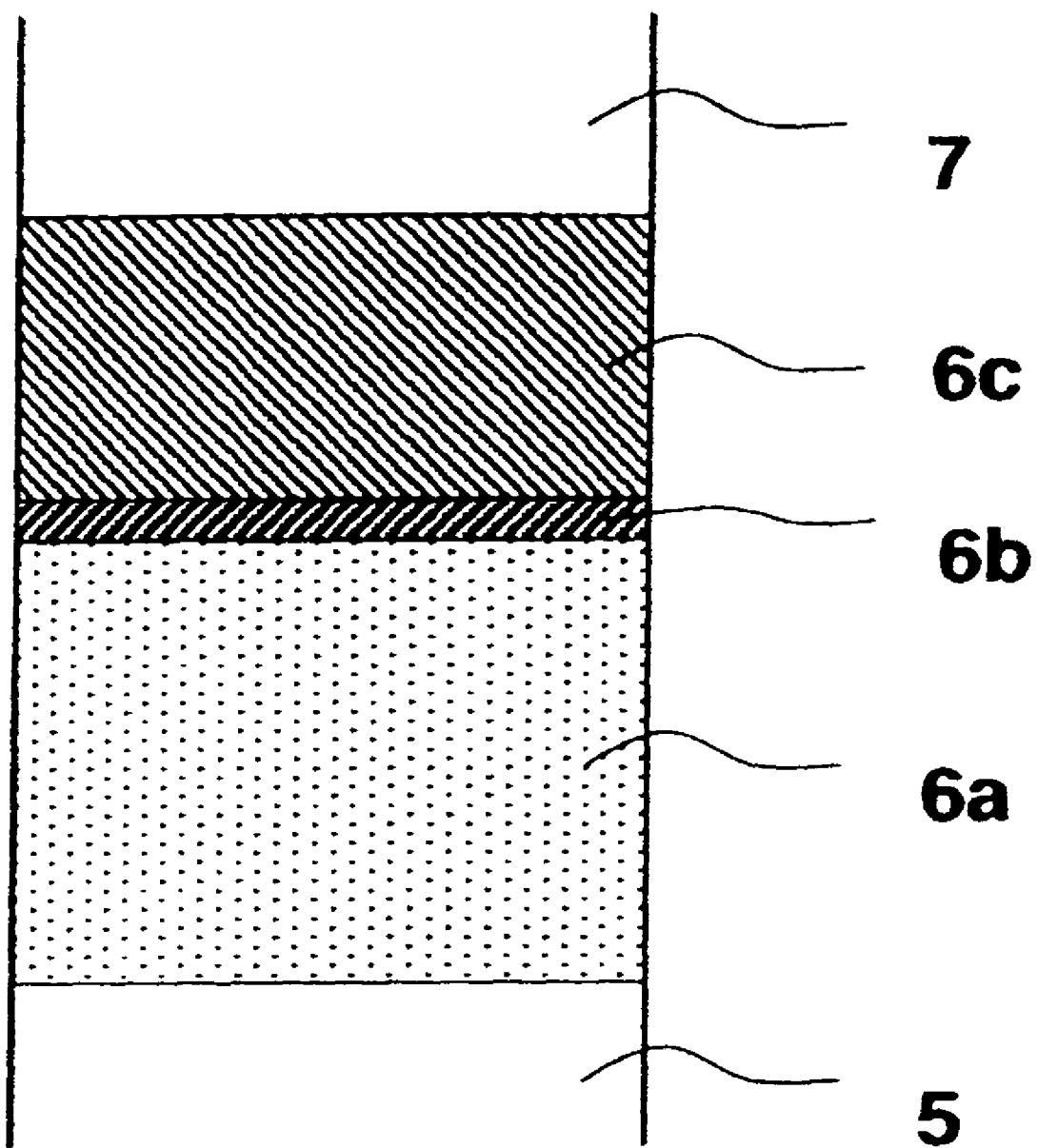
FIG. 3 is an enlarged structural view of a magnetic recording layer.
Figure 4:
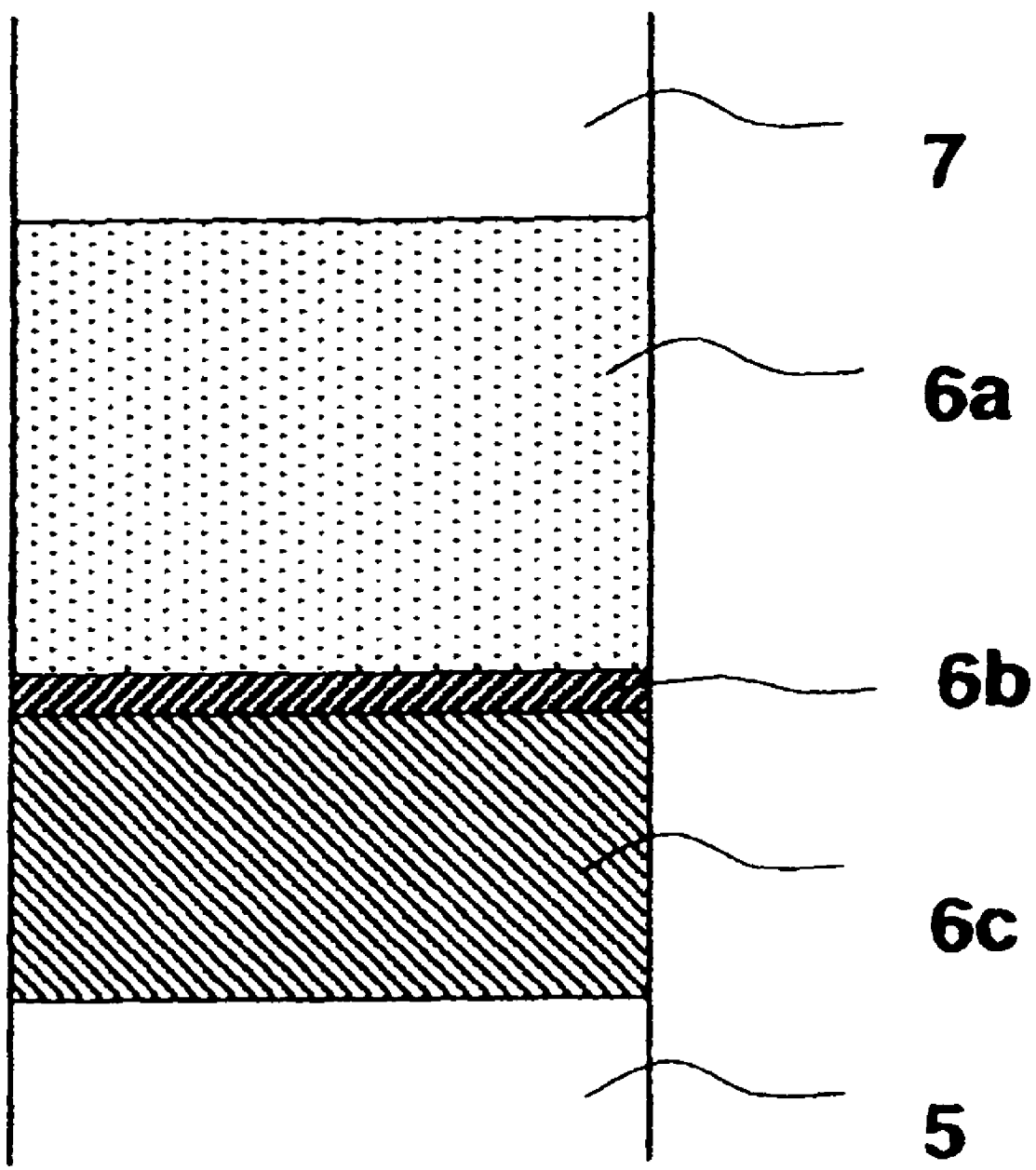
FIG. 4 is an enlarged structural view of a magnetic recording layer.

FIG. 3 is a view showing a stacked structure in an enlarged scale of a magnetic recording layer 6 of the perpendicular magnetic recording medium shown in FIG. 1. A perpendicular recording layer 6a, a magnetic coupling layer 6b, and a writing assist layer 6c are stacked in this order between the intermediate layer 5 and the protective layer 7. The order of stacking the perpendicular recording layer 6a, the magnetic coupling layer 6b, and the writing assist layer 6c may be inversed as shown in FIG. 4 such that the writing assist layer 6c is disposed at the lowest position for the three layers and the perpendicular recording layer 6a is disposed at the top. In such an arrangement, care has to be taken for the segregation of the perpendicular recording layer 6a. In the case where the segregation is not favorable, a coercivity of the perpendicular recording layer 6a more than 318 kA/m (4 kOe) can not be obtained.

Figure 5:
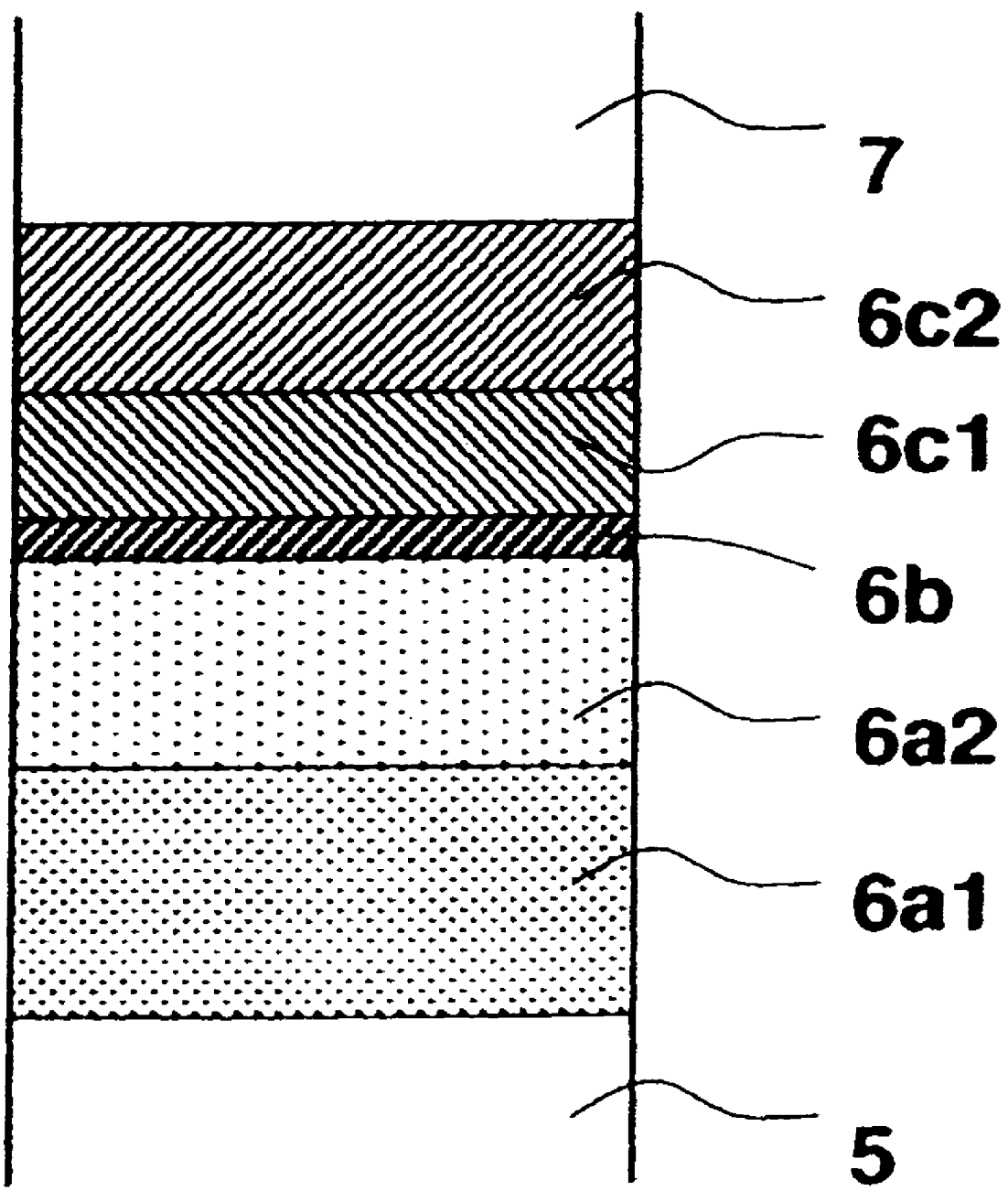
FIG. 5 is an enlarged structural view of a magnetic recording layer.

As shown in FIG. 5, the perpendicular recording layer and the writing assist layer may be constituted each with two or more layers having different structures or magnetic properties. For example, the perpendicular recording layer 6a may be constituted with a perpendicular recording layer 6a1 and a perpendicular recording layer 6a2 of different Cr or Pt contents. In the case of adopting such a structure comprising two perpendicular recording layers, balance can be taken easily for compatibilizing the writability and the thermal stability. For example, the perpendicular recording layer 6a1 can be constituted such that the Pt content is more and the Cr content is less than those of the perpendicular recording layer 6a2. With such a constitution, large Ku of the perpendicular recording layer 6a1 contributes to favorable maintenance of the medium thermal stability and small Ku of the perpendicular recording layer 6a2 contributes to favorable maintenance of the writability. Other examples include a structure comprising two writing assist layers and it can be constituted such that the writing assist layer 6c1 contains an oxide for reducing the noise, and the writing assist layer 6c2 does not contain the oxide for obtaining good medium reliability.

The perpendicular coercivity of the entire magnetic recording layer is preferably more than 239 kA/m (3 kOe). In the case where the perpendicular coercivity of the entire magnetic recording layer is smaller than 239 kA/m (3 kOe), the thermal stability becomes insufficient making it difficult to narrow the recording track width.

The medium writability is in direct proportion with the saturation magnetic field Hs of the medium. In order to ensure good writability, the saturation magnetic field is preferably set smaller than a specified value determined depending on the kind of the head to be used. In the case of using a trailing shield type recording head, the saturation magnetic field is preferably set to lower than 796 kA/m (10 kOe).

The thickness for the entire magnetic recording layer is preferably set to 5 nm or more and 40 nm or less, and, more preferably, to 10 nm or more and 30 nm or less. In the case where the thickness of the entire magnetic recording layer is less than 5 nm, the thermal stability is sometimes insufficient and, in the case where it is thicker than 40 nm, the grain size is excessively large to sometimes result in increased noise.

During deposition of the magnetic recording layer, a negative bias voltage may be applied to a substrate and the negative bias voltage can be set, for example, between −100 V and −300 V. By applying the negative bias voltage, it is possible to promote the compositional segregation, improve the medium recording resolution, and decrease the noise.

The protective layer 7 is a layer having a function of protecting the magnetic recording layer 6 against corrosion and moderating damages given on the surface of the magnetic recording layer 6 when a head is in contact with the surface of a magnetic disk. The protective layer mainly includes a carbon material and is usually N-doped for improving the hardness. The protective layer comprising the carbon material can be deposited by a CVD method, IBD method, or magnetron sputtering method. The thickness of the protective layer can be 1 nm or more and 5 nm or less and the thickness of the protective layer is preferably made thin in order to improve the recording resolution of the medium. Within a range not deteriorating the reliability, the thickness of the protective layer comprising the carbon material is preferably as thin as possible.

A lubrication layer 8 preferably contains a lubricant such as perfluro polyether, fluoro-substituted alcohol, fluoro-substituted carboxylic acid, etc.

Figure 2:
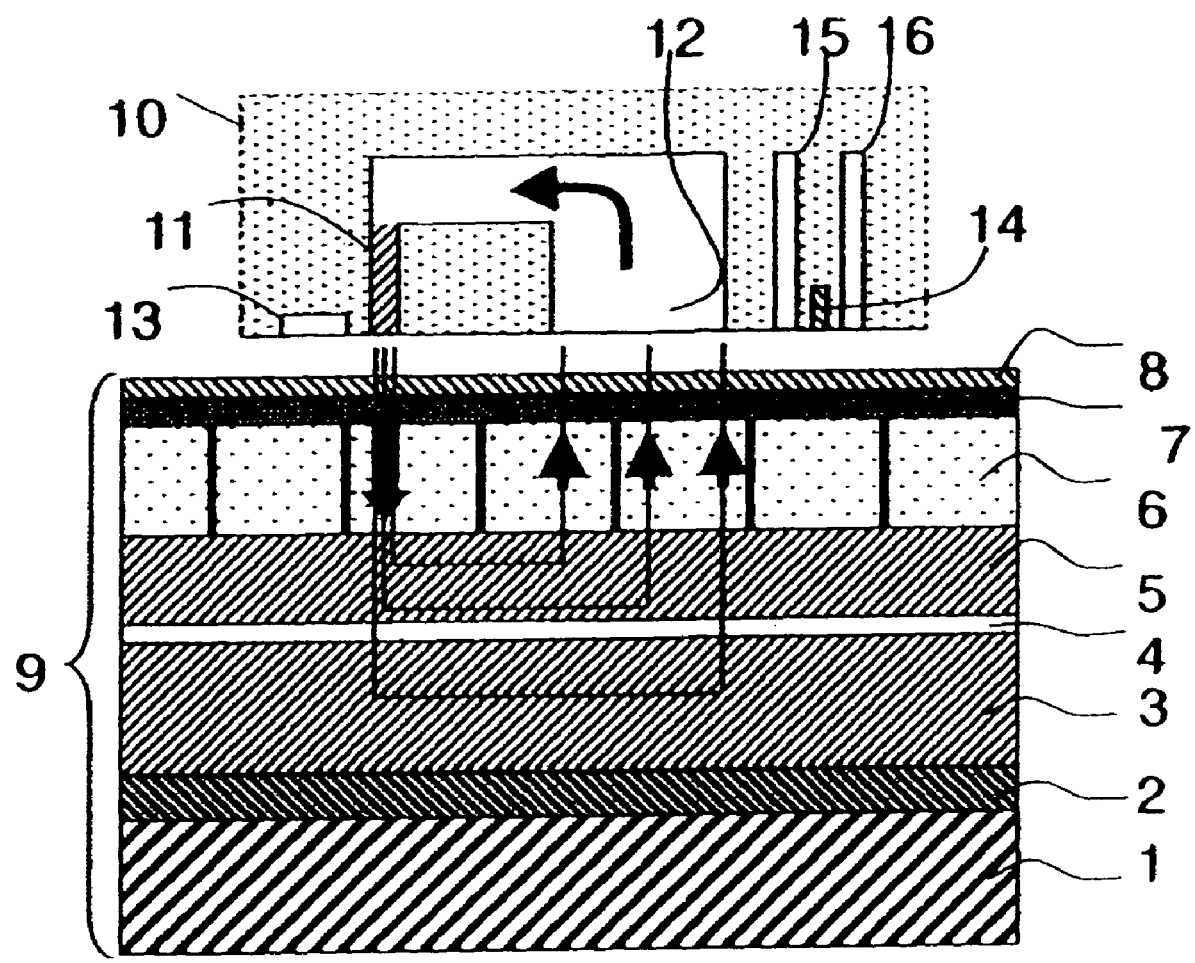
FIG. 2 is a view showing a perpendicular magnetic recording apparatus applicable to a medium according to an embodiment of the invention.

FIG. 2 schematically shows a cross sectional view of a perpendicular magnetic recording device capable of using the medium of this embodiment. The device shown in FIG. 2 includes a magnetic recording medium 9 and a magnetic head 10. The magnetic head 10 has a writing main pole 11, an auxiliary return pole 12, a trailing shield 13 for the writing main pole 11, a giant magnet resistive (GMR) or tunnel magnetoresistive (TMR) sensor 14, a reading shield 15, and a reading shield 16. The head of this type is referred to as a trailing shield (TS) type head. Compared with a single pole (SP) type head not having the trailing shield 13, the trailing shield type head has a larger writing magnetic gradient but, instead, the intensity of the writing magnetic field is somewhat weakened. The medium 9 includes a non-magnetic substrate 1, an adhesion layer 2, a soft magnetic underlayer 3, a seed layer 4, an intermediate layer 5, a magnetic recording layer 6, a protective layer 7, and a lubrication layer 8. Magnetic fluxes going out of the main pole 11 pass the soft magnetic underlayer 3, reach the return pole 12 and bits are recorded by the main pole 11. In the case of using the trailing shield type head, an extremely low saturation magnetization (796 kA/m or lower) is required for the medium in order to enable saturation recording. Embodiments of the invention provide a perpendicular magnetic recording medium suitable for combination with the trailing shield type head described above than combination with the single pole type head.

EXAMPLE 1

By using a DC magnetron sputtering apparatus (C-3010) manufactured by ANERVA Corp., a perpendicular magnetic recording medium of a layered constitution shown in FIG. 1 was manufactured. The sputtering apparatus has a plurality of processing chambers and can deposit a multiple layer. After evacuating each of the chambers to a vacuum degree of $1 \times 10^{-5}$ Pa or lower, a cleaned 2.5 inch glass substrate was placed in the chamber and deposition was started.

An adhesion layer 2 was deposited on a substrate 1 by using an Al—Ti (50 at %) target. The thickness of the adhesion layer was 5 nm and an Ar gas pressure during deposition was 0.5 Pa. Numerical values shown in brackets after elements are contents of the elements.

A soft magnetic underlayer 3 having an anti-ferromagnetically coupled sandwich structure (Co—Ta—Zr 15 nm/Ru 0.7 nm/Co—Ta—Zr 15 nm) was disposed over the adhesion layer 2. A Co—Ta—Zr film was deposited by using a Co—Ta (8 at %)-Zr (5 at %) target under an Ar gas pressure of 0.5 Pa. For obtaining a maximum anti-ferromagnetic coupling force between the two soft magnetic layers, the thickness of the Ru layer was optimized to 0.7 nm. The exchange coupling magnetic field can be measured by Kerr effect. For example, it can be measured by using a Kerr effect measuring apparatus for soft magnetic underlayers manufactured by NEOARC Co. by applying a magnetic field to a film surface and recording the change of Kerr rotation angle of a surface layer to the applied magnetic field.

After completing the deposition of the soft magnetic underlayer 3, the disk was moved into a chamber having an Ni—W (8 at %) target for deposition of a seed layer to form a seed layer 4. The seed layer has a face-centered cubic crystal structure in which the (111) crystal direction is oriented in the direction perpendicular to the film surface. The thickness of the seed layer comprising Ni—W was 6 nm. Further, the pressure during deposition of the seed layer was 0.5 Pa.

An intermediate layer 5 was formed on the seed layer 4. In this embodiment, the intermediate layer 5 was constituted with a 2-stage Ru layer. A first Ru layer of 8 nm thickness was deposited on the seed layer 4 under an Ar gas pressure of 1 Pa, and a second Ru layer of 8 nm thickness was deposited on the first Ru layer under an Ar gas pressure of 5 Pa. The Ru layer was formed at a low gas pressure for obtaining a good perpendicular orientation of the c-axis and the Ru layer was formed at a high gas pressure for promoting the segregation of oxides to the grain boundary in the perpendicular recording layer to decrease the grain size.

A perpendicular recording layer 6a was formed by using a (Co—Cr (17 at %)-Pt (18 at %))-SiO2 (8 mol %) target. As a sputtering gas, a gas mixture of argon and oxygen with the oxygen partial pressure of 0.02 Pa was used and the total pressure of the sputtering gas was 5 Pa. During sputtering deposition, a bias voltage at −200 V was applied to the disk and the processing time was controlled such that the thickness of the perpendicular recording layer 6a was 13 nm.

A magnetic coupling layer 6b was formed using a Co—Cr (26 at %) target by sputtering under an Ar gas pressure of 1 Pa. For finding an optimal thickness of the magnetic coupling layer, specimens with the thickness being changed in a range from 0 to 4 nm were prepared.

A writing assist layer 6c was formed using a Co—Cr (12 at %)-Pt (18 at %)-B (10 at %) target by sputtering under an Ar gas pressure of 1 Pa. The thickness of the writing assist layer 6c was 4.4 nm and a bias voltage at −200 V was applied to the substrate during sputtering deposition.

A protective film 6 was formed using a carbon target by a sputtering method in a gas mixture of argon and nitrogen where the argon gas pressure was 0.6 Pa and nitrogen gas pressure was 0.05 Pa. The thickness of the protective layer 6 was 4 nm.

Figure 6:
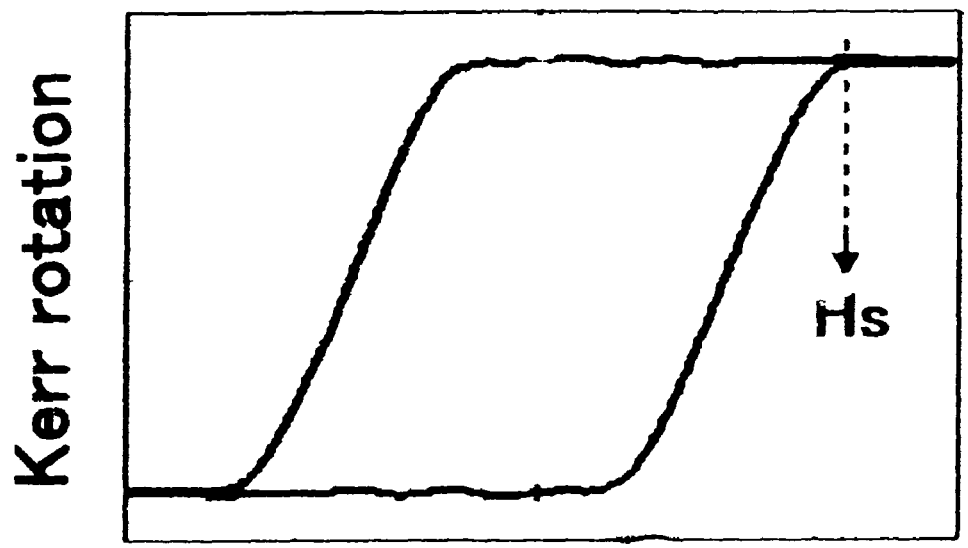
FIG. 6 is a view showing a polar Kerr-magnetic hysteresis loop in an embodiment of the invention.

After forming the protective layer, a lubrication film was formed on the surface of the protective layer. For evaluating the magnetic properties of the obtained perpendicular magnetic recording media, a polar Kerr magnetic hysteresis loop (Kerr loop) was measured by using a polar Kerr magnet meter. FIG. 6 shows an example of a typical Kerr loop. The saturation magnetic field Hs of the medium shown in the figure is substantially related to the magnetization reversal of the perpendicular recording layer and greatly concerned with the medium writability. The parameter is used for characterizing the magnetic property of the medium.

Writing/reading properties of the obtained perpendicular magnetic recording media were evaluated by using a spin-stand. The recording head is a TS-type head and the reading device is a giant magnetesistive (GMR) reading device. For evaluating the medium noise level, signal to noise ratio (SONR) was measured. The signal to noise ratio was defined as a ratio between the low frequency signal at 6.9 kfr/mm (flux reversal per millimeter) (175 KFCI) and integrated medium noises at 2 T frequency of 20.9 kfr/mm (531 kFCI).

Table 1 lists the composition, the saturation magnetization Ms, and the thickness of each of the layers constituting the magnetic recording layer of the perpendicular magnetic recording medium manufactured in Example 1. As shown in Table 1, the perpendicular recording layer 6a had a composition of (Co—Cr (17 at %)-Pt (18 at %))-SiO2 8 mol %), a thickness of 13 nm, and a saturation magnetization Ms of 450 kA/m. The magnetic coupling layer 6b had a composition of Co—Cr (26 at %), a saturation magnetization Ms of 260 kA/m, the writing assist layer 6c had a composition of Co—Cr (12 at %)-Pt (18 at %)-B (10 at %), a thickness of 4.4 nm, and a saturation magnetization Ms of 500 kA/m.

TABLE 1

|  | Composition | Saturation magnetization MS (kA/m) | Thickness (nm) |
|---|---|---|---|
| Writing assist layer | Co—Cr(12 at %)—Pt(18 at %)—B(10 at %) | 500 | 4.4 |
| Magnetic coupling layer | Co—Cr(26 at %) | 260 | 0-4 |
| Perpendicular recording layer | (Co—Cr(17 at %)—Pt(18 at %)—SiO$_2$(8 mol %) | 450 | 13 |

Figure 7:
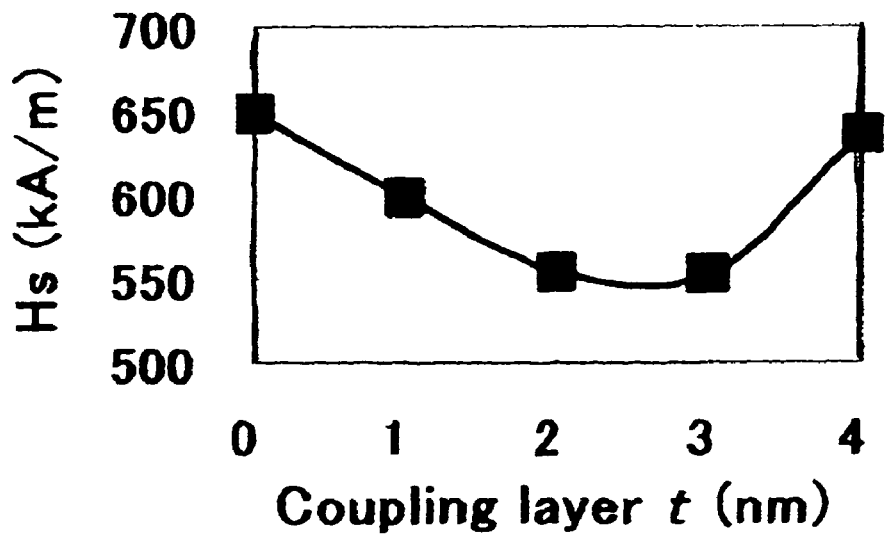
FIG. 7 is a view showing a relation between the thickness of a magnetic coupling layer and the saturation magnetic field Hs of a perpendicular magnetic recording medium of Example 1.

FIG. 7 shows a relation between the saturation magnetic field Hs and the thickness of the magnetic coupling layer. As the thickness of the magnetic coupling layer increases, the saturation magnetic field Hs decreases, and the saturation magnetic field Hs reaches a minimum value at about 3 nm. When the thickness of the magnetic coupling layer exceeds 3 nm, the saturation magnetic field Hs increases. The dependence of the saturation magnetic field Hs on the thickness of the magnetic coupling layer distinctly shows the exchange spring effect of facilitating the magnetization reversal by properly controlling the magnetic coupling between the writing assist layer and the perpendicular recording layer. In this example, the magnetic coupling between the writing assist layer and the perpendicular recording layer is controlled by the thickness of the magnetic coupling layer. In the case where the thickness of the magnetic coupling layer is less than 2 nm, the exchange coupling in the perpendicular direction between the two adjacent magnetic layers is excessively strong and, on the other hand, the coupling is excessively weak in the case where the thickness of the magnetic coupling layer exceeds 3 nm. Only at about 2 nm to 3 nm, the exchange coupling force in the perpendicular direction shows an appropriate value which minimizes the saturation magnetic field Hs. As described above, it has been found that use of a magnetic material of law saturation magnetization is effective as a magnetic coupling layer in an exchange spring type perpendicular magnetic recording medium. When compared with non-magnetic materials, low saturation magnetization materials have much larger values for the optimal thickness. By using the low saturation magnetization material for the magnetic coupling layer, stable magnetic properties can be attained in the mass production of magnetic disks as the exchange spring type media.

Figure 8:
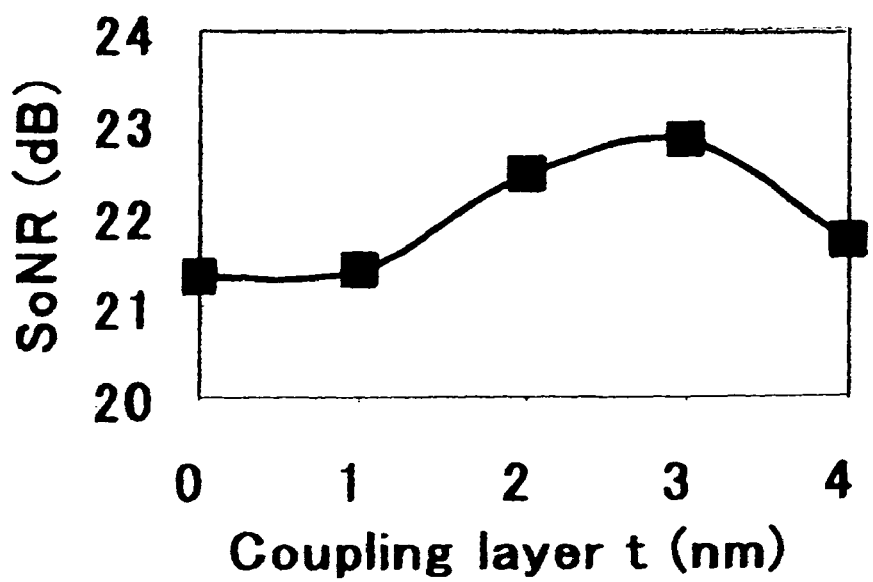
FIG. 8 is a view showing a relation between the thickness of a magnetic coupling layer and the signal to noise ratio SoNR of the perpendicular magnetic recording medium of Example 1.

FIG. 8 shows the medium noise property. When compared with the medium not with insertion of the magnetic coupling layer, a medium with insertion of a 3 nm magnetic coupling layer of low saturation magnetization showed improvement of about 1.5 dB in the signal to noise ratio SoNR. This shows that the exchange spring medium in which the magnetic coupling layer comprises a low saturation magnetization material has a possibility of obtaining a higher recording density than that of a usual medium not using exchange spring. Further, it was confirmed that the transition jitter decreases as the exchange spring effect increases to weaken the angular dependence of the reversal field, and it is considered that also this contributes to the improvement of the writing/reading properties.

EXAMPLE 2

A magnetic disk was manufactured, and magnetic properties and writing/reading properties were measured by using the manufacturing steps and the evaluation method identical with those in Example 1. In this example, since the magnetic coupling layer 6b contains SiO$_2$, a granular structure was formed. Table 2 lists the composition, the saturation magnetization Ms and the thickness for each of the layers constituting the magnetic recording layer of the perpendicular magnetic recording medium manufactured in this example. As shown in Table 2, the perpendicular recording layer 6a had a composition of (Co—Cr (17 at %)-Pt (18 at %))-SiO$_2$ (8 mol %), the thickness of 13.5 nm and the saturation magnetization Ms of 450 kA/m. The magnetic coupling layer 6b had composition of (Co—Cr (25 at %))-SiO$_2$ 8 (mol %), and saturation magnetization Ms of 250 kA/m. The writing assist layer 6c had a composition of Co—Cr (12 at %)-Pt (14 at %)-B (10 at %), the thickness of 5 nm and the saturation magnetization Ms of 500 kA/m. The composition and the thickness for each of the layers other than those described above were identical with those in Example 1.

TABLE 2

|  | Composition | Saturation magnetization MS (kA/m) | Thickness (nm) |
|---|---|---|---|
| Writing assist layer | Co—Cr(12 at %)—Pt(14 at %)—B(10 at %) | 500 | 5 |
| Magnetic coupling layer | Co—Cr(25 at %))—SiO$_2$(8 mol %) | 250 | 0-4 |
| Perpendicular recording layer | (Co—Cr(17 at %)—Pt(18 at %)—SiO$_2$(8 mol %) | 450 | 13 |

Figure 9:
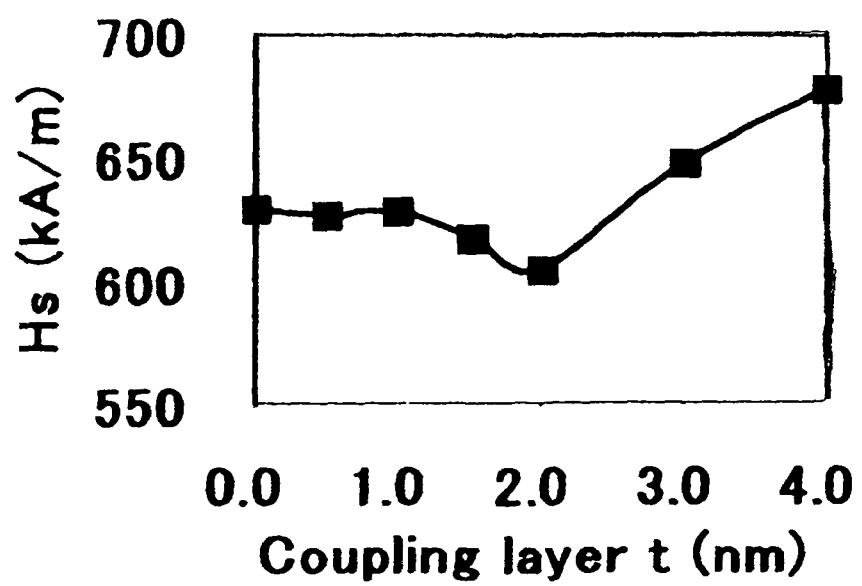
FIG. 9 is a view showing a relation between the thickness of a magnetic coupling layer and the saturation magnetic field Hs of a perpendicular magnetic recording medium of Example 2.
Figure 10:
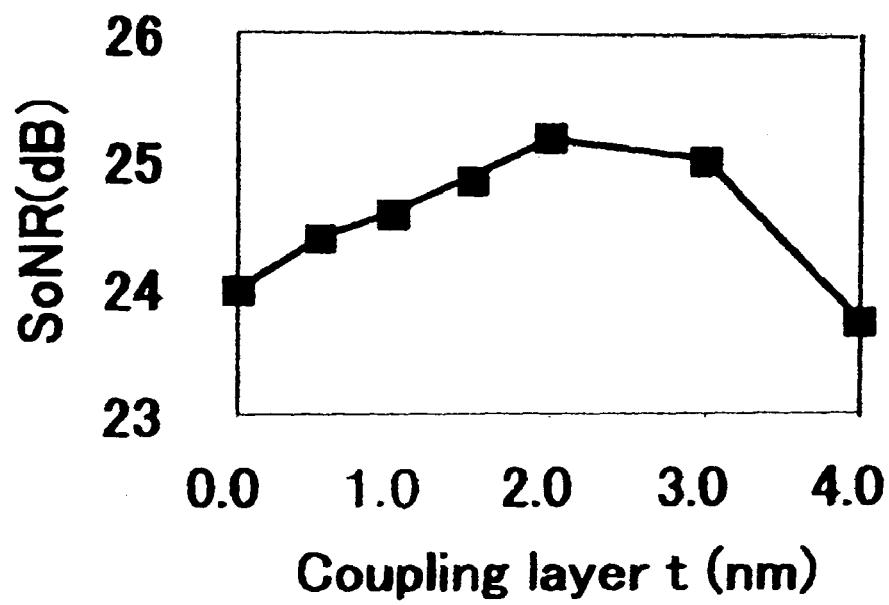
FIG. 10 is a view showing a relation between the thickness of a magnetic coupling layer and the signal to noise ratio SoNR of the perpendicular magnetic recording medium of Example 2.

As shown in FIGS. 9 and 10, when a granular type magnetic coupling layer having a thickness of less than 2 nm was inserted, since the exchanging spring effect increases, the saturation field Hs decreases. As the thickness of the magnetic coupling layer increases from 0 to 2 nm, the signal to noise ratio SoNR is improved by about 1.2 dB, and the magnetic coupling layer of low saturation magnetization having the granular structure can be used as the magnetic coupling layer in the exchange spring medium. Since the oxide grain boundary extends to the vicinity of the portion adjacent with the writing assist layer by the granular structure in the magnetic coupling layer, noises from the writing assist layer disposed continuously can be decreased. In the case of using a material having an extremely high Ms for the writing assist layer, the noise can be greatly decreased particularly.

COMPARATIVE EXAMPLE 1

A magnetic disk was manufactured, and magnetic properties and writing/reading properties were measured by using the manufacturing steps and the evaluation method identical with those in Example 1. In this comparative example, the magnetic coupling layer 6b comprised Ru and the magnetic coupling layer used a non-magnetic layer. Table 3 lists the composition, the saturation magnetization Ms, and the thickness for each of the layers constituting the magnetic recording layer of the perpendicular magnetic recording medium manufactured in this comparative example. As shown in Table 3, the perpendicular recording layer 6a had a composition of (Co—Cr (15 at %)-Pt (18 at %))-SiO$_2$ (8 mol %), a thickness of 11.5 nm, and a saturation magnetization Ms of 500 kA/m. The magnetic coupling layer 6b comprised Ru and saturation magnetization Ms was 0 kA/m. The writing assist layer 6c had a composition of (Co—Cr (20 at %))-SiO$_2$ (8 mol %), a thickness of 6 nm, and a saturation magnetization Ms of 500 kA/m. The composition and the thickness for each of the layers other than those described above were identical with those in Example 1.

TABLE 3

| | Composition | Saturation magnetization MS (kA/m) | Thickness (nm) |
|---|---|---|---|
| Writing assist layer | Co—Cr(20 at %))—SiO$_2$(8 mol %) | 500 | 6 |
| Magnetic coupling layer | Ru | 0 | 0-0.32 |
| Perpendicular recording layer | (Co—Cr(15 at %)—Pt(18 at %)—SiO$_2$(8 mol %) | 500 | 11.5 |

Figure 11:
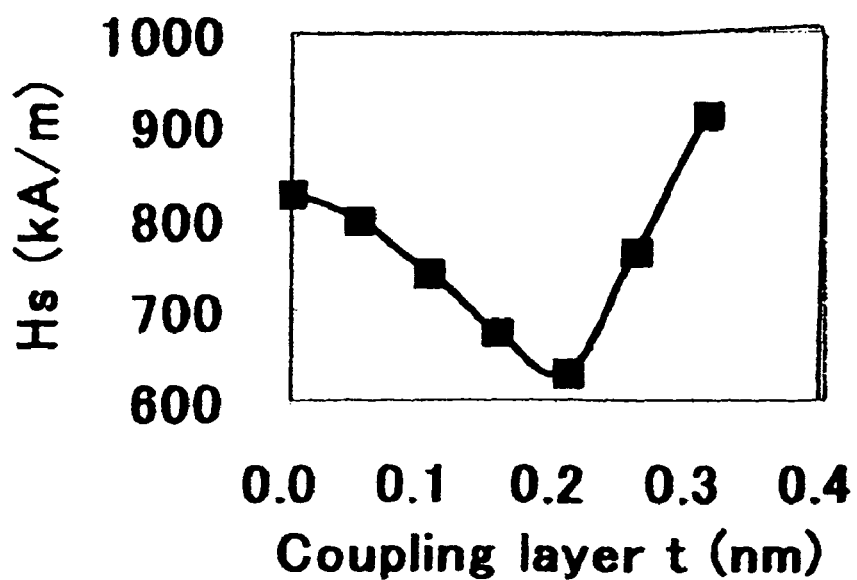
FIG. 11 is a view showing a relation between the thickness of a magnetic coupling layer and the saturation magnetic field Hs of a perpendicular magnetic recording medium of Comparative Example 1.
Figure 12:
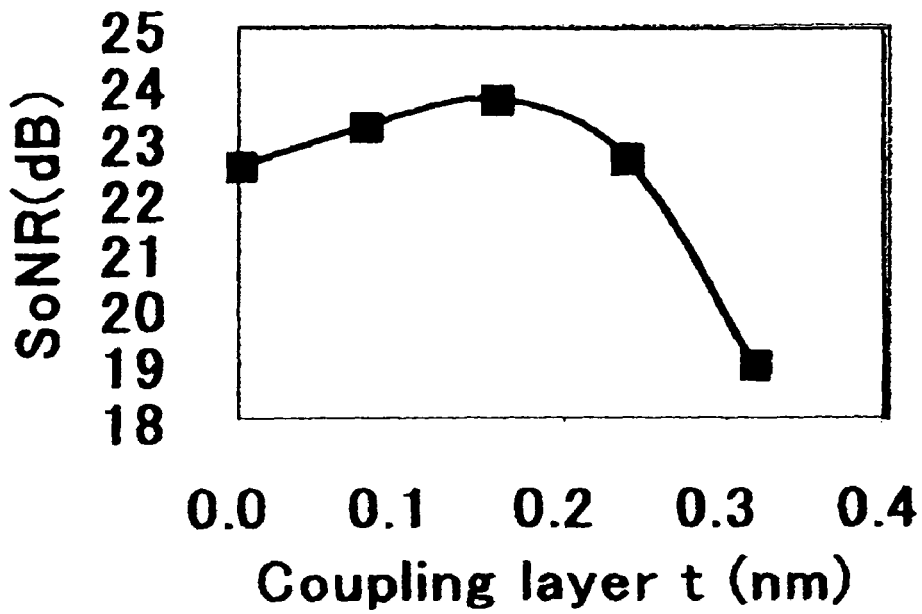
FIG. 12 is a view showing a relation between the thickness of a magnetic coupling layer and the signal to noise ratio SoNR of the perpendicular magnetic recording medium of Comparative Example 1.

As seen in FIGS. 11 and 12, the saturation magnetic field Hs depends on the thickness of the magnetic coupling layer 6b comprising Ru extremely sensitively showing that the non-magnetic material causes abrupt change of the magnetic state at the boundary between the perpendicular recording layer and the writing assist layer. The optimal thickness of the magnetic coupling layer 6b comprising Ru is about 0.2 nm where Hs has a minimum value and the signal to noise ratio SoNR shows a highest level in FIGS. 11 and 12. However, at a thickness of 0.25 nm which is slightly larger by about 0.05 nm than the optimal Ru thickness, the signal to noise ratio SoNR is less than the case of not inserting the magnetic coupling layer. As described above, in the case of using Ru for the magnetic coupling layer, also the writing/reading properties of the medium depend extremely sensitively on the thickness of the magnetic coupling layer. Upon mass production of the magnetic disk, it is extremely difficult to precisely control the thickness of the magnetic coupling layer 6b comprising Ru with the thickness at the level of less than the single atom layer thickness, and it is impossible to stably produce a perpendicular magnetic recording medium having excellent writing/reading properties.

COMPARATIVE EXAMPLE 2

A magnetic disk was manufactured, and magnetic properties and writing/reading properties were measured by using the manufacturing steps and the evaluation method identical with those in Example 1. In this comparative example, the magnetic coupling layer 6b comprised Co—Ru(40 at %) and the magnetic coupling layer used a non-magnetic layer like in Comparative Example 1. Table 4 lists the composition, the saturation magnetization Ms, and the thickness for each of the layers constituting the magnetic recording layer of the perpendicular magnetic recording medium manufactured in this comparative example. As shown in Table 4, the perpendicular recording layer 6a had a composition of (Co—Cr (17 at %)-Pt (18 at %))-SiO$_2$ (8 mol %), a thickness of 13.5 nm and a saturation magnetization Ms of 450 kA/m. The magnetic coupling layer 6b had a composition of Co—Ru(40 at %) and, accordingly, the saturation magnetization Ms was 0 kA/m. The writing assist layer 6c had a composition of Co—Cr (12 at %)-Pt (14 at %)-B (10 at %), a thickness of 4.5 nm, and a saturation magnetization Ms of 500 kA/m. The composition and thickness for each of the layers than those described above were identical with those in Example 1.

TABLE 4

| | Composition | Saturation magnetization MS (kA/m) | Thickness (nm) |
|---|---|---|---|
| Writing assist layer | Co—Cr(12 at %)—Pt(14 at %)—B(10 at %) | 500 | 4.5 |
| Magnetic coupling layer | Co—Ru (40 at %) | 0 | 0-1.2 |
| Perpendicular recording layer | (Co—Cr(17 at %))—Pt(18 at %))—SiO$_2$(8 mol %) | 450 | 13.5 |

Figure 13:
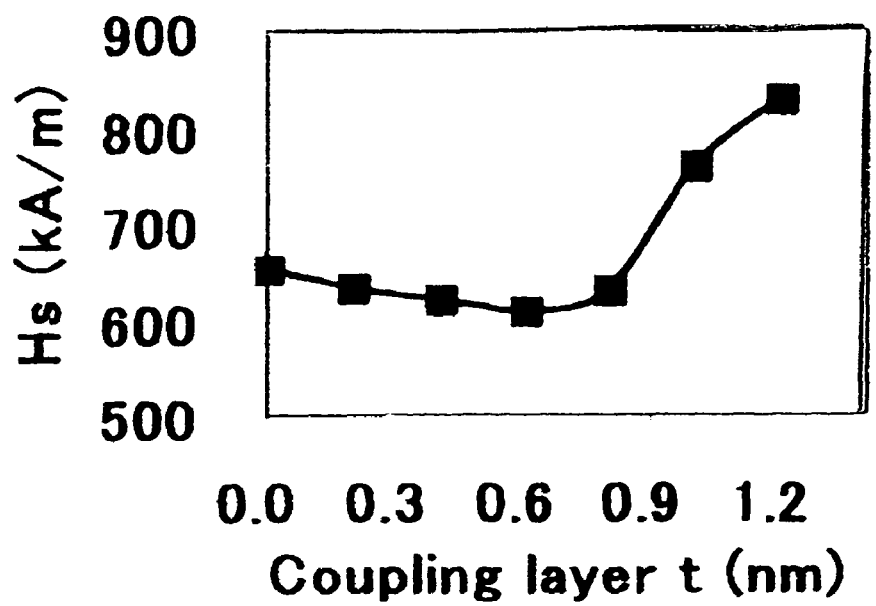
FIG. 13 is a view showing a relation between the thickness of a magnetic coupling layer and the saturation magnetic field Hs of a perpendicular magnetic recording medium of Comparative Example 2.
Figure 14:
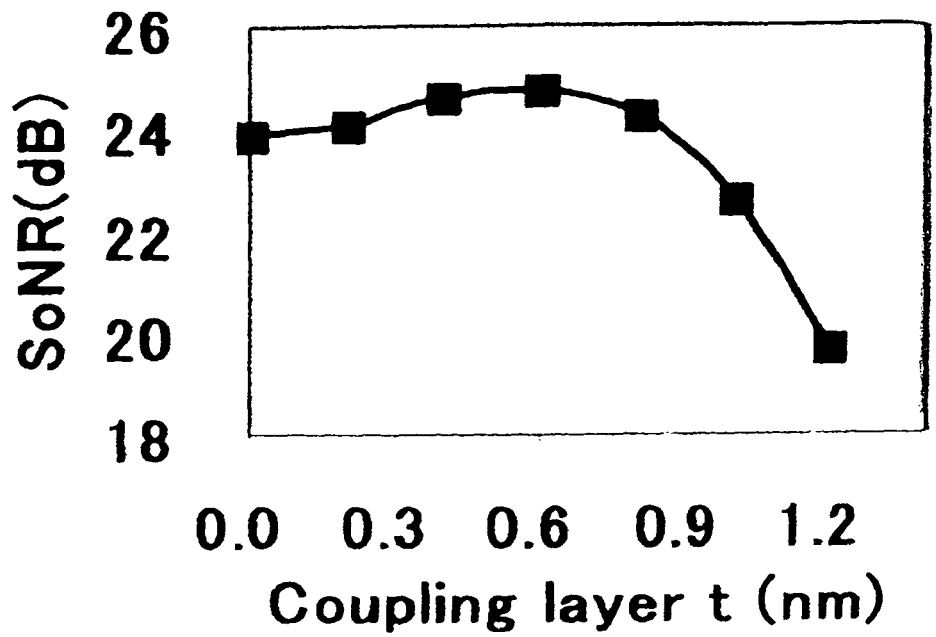
FIG. 14 is a view showing a relation between the thickness of a magnetic coupling layer and the signal to noise ratio SoNR of the perpendicular magnetic recording medium of Comparative Example 2.

As shown in FIGS. 13 and 14, by the presence of Co atom at the boundary in the Co—Ru alloy, the optimal thickness of the magnetic coupling layer can be increased to about 0.6 nm. However, even such optimal thickness is still excessively thin for the control upon mass production of the magnetic disks and it is difficult to stably produce perpendicular magnetic recording media having excellent writing/reading properties.

EXAMPLE 3

A magnetic disk was manufactured, and magnetic properties and writing/reading properties were measured by using the manufacturing steps and the evaluation method identical with those in Example 1. Table 5 lists the composition, the saturation magnetization Ms and the thickness for each of the layers constituting the magnetic recording layer of the perpendicular magnetic recording medium manufactured in this example. As shown in Table 5, the perpendicular recording layer 6a had a composition of (Co—Cr (17 at %)-Pt (18 at %))-SiO$_2$ (8 mol %), the thickness of 13.5 nm, and the saturation magnetization Ms of 450 kA/m. The magnetic coupling layer 6b had a composition of Co—Cr (30 at %), and a measured saturation magnetization Ms of 30 kA/m or less. The writing assist layer 6c had a composition of Co—Cr (22 at %)-Pt (14 at %)-B (10 at %), the thickness of 4 nm, and the saturation magnetization Ms of 500 kA/m. The magnetic coupling layer 6b of this example had an extremely low saturation magnetization Ms compared with Example 1 or Example 2. The composition and the thickness for each of the layers other than those described above were identical with those in Example 1.

TABLE 5

| | Composition | Saturation magnetization MS (kA/m) | Thickness (nm) |
|---|---|---|---|
| Writing assist layer | Co—Cr(12 at %)—Pt(14 at %)—B(10 at %) | 500 | 4 |
| Magnetic coupling layer | Co—Cr(30 at %) | –30 | 0-2.5 |
| Perpendicular recording layer | (Co—Cr(17 at %)—Pt(18 at %)—SiO$_2$(8 mol %) | 450 | 13.5 |

Figure 15:
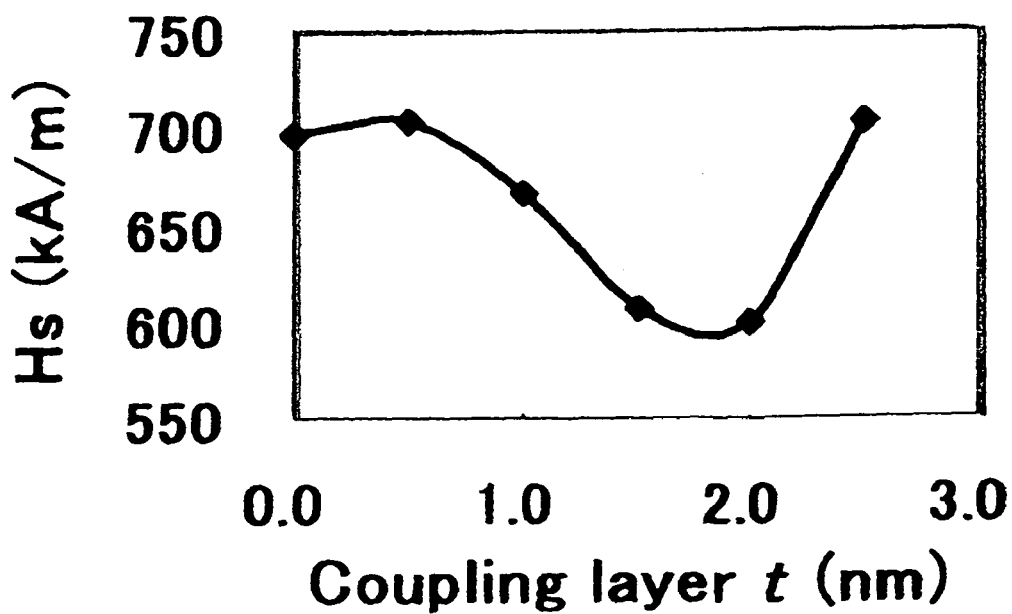
FIG. 15 is a view showing a relation between the thickness of a magnetic coupling layer and the saturation magnetic field Hs of a perpendicular magnetic recording medium of Example 3.
Figure 16:
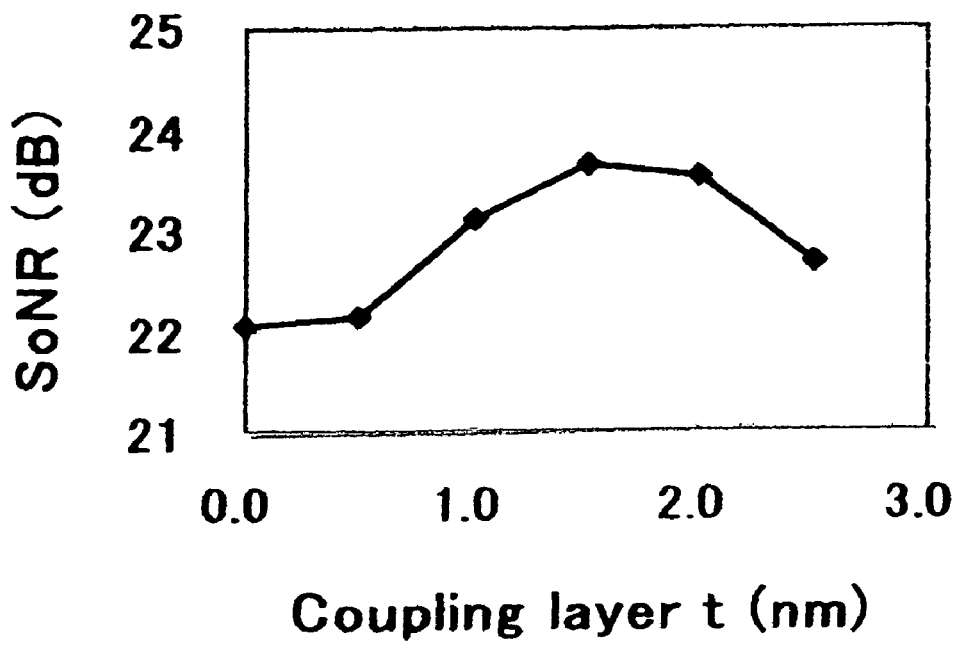
FIG. 16 is a view showing a relation between the thickness of a magnetic coupling layer and the signal to noise ratio SoNR of the perpendicular magnetic recording medium of Example 3.

As shown in FIGS. 15 and 16, when the magnetic coupling layer having a thickness of about 1 to 2 nm is inserted, since the exchange spring effect increases, the saturation magnetic field Hs can be decreased. As the thickness of the magnetic coupling layer increases from 0 to 1.6 nm, the signal to noise ratio SoNR is improved by about 1.6 dB. While the optimal thickness of the magnetic coupling layer is thinner compared with the result of Example 1, it has a thickness of about 10 times compared with Comparative Example 1 using Ru as the magnetic coupling layer and about three times compared with Comparative Example 2 using Co—Ru (40 at %) as the magnetic coupling layer. This facilitates control of the thickness for the magnetic coupling layer in an appropriate range in the mass production of continuously depositing magnetic disks at a scale of 100,000 disks and enables stable production of perpendicular magnetic recording media having excellent writing/reading properties.

EXAMPLE 4

A magnetic disk was manufactured, and magnetic properties and writing/reading properties were measured by using the manufacturing steps and the evaluation method identical with those in Example 1. Table 6 lists the composition, the saturation magnetization Ms, and the thickness for each of the layers constituting the magnetic recording layer of the perpendicular magnetic recording medium manufactured in this example. As shown in Table 6, the perpendicular recording layer $6a$ had a composition of (Co—Cr (17 at %)-Pt (18 at %))-$SiO_2$ (8 mol %), a thickness of 13.5 nm, and a saturation magnetization Ms of 450 kA/m. The magnetic coupling layer $6b$ had a composition of Co—Cr (27 at %))-$SiO_2$ 8 (mol %), and a saturation magnetization Ms of 200 kA/m. The writing assist layer $6c$ had a composition of Co—Cr (12 at %)-Pt (6 at %), a thickness of 3 nm and a saturation magnetization Ms of 760 kA/m. The writing assist layer $6c$ of this example had an extremely higher saturation magnetization Ms compared with Examples 1 to 3. The composition and the thickness for each of the layers other than those described above were identical with those in Example 1.

TABLE 6

| | Composition | Saturation magnetization MS (kA/m) | Thickness (nm) |
| --- | --- | --- | --- |
| Writing assist layer | Co—Cr(12 at %)—Pt(6 at %) | 760 | 3 |
| Magnetic coupling layer | Co—Cr(27 at %) | 200 | 0-3 |
| Perpendicular recording layer | (Co—Cr(17 at %)—Pt(18 at %)—$SiO_2$(8 mol %) | 450 | 13.5 |

Figure 17:
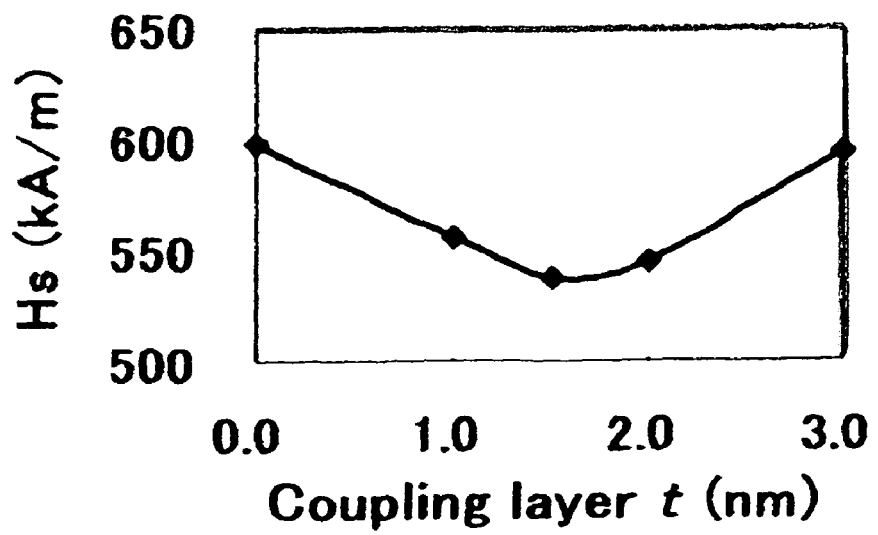
FIG. 17 is a view showing a relation between the thickness of a magnetic coupling layer and the saturation magnetic field Hs of a perpendicular magnetic recording medium of Example 4.
Figure 18:
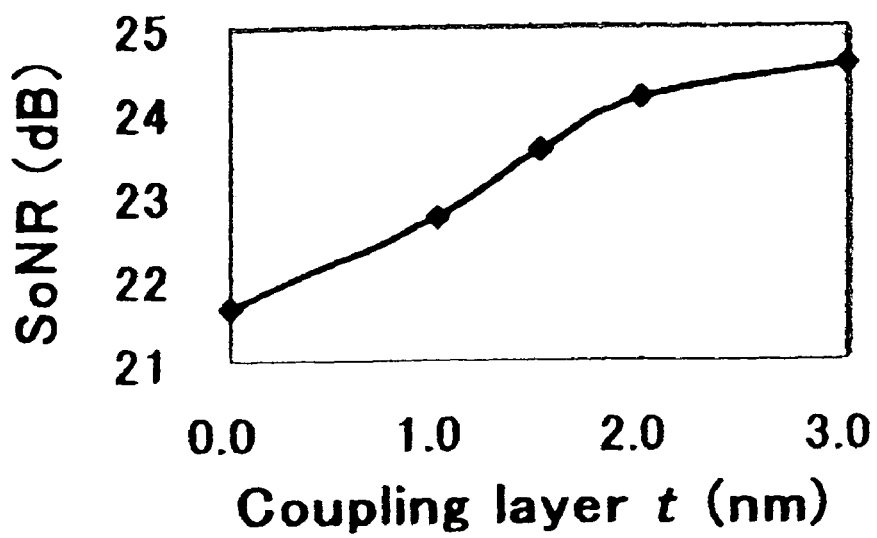
FIG. 18 is a view showing a relation between the thickness of a magnetic coupling layer and the signal to noise ratio SoNR of the perpendicular magnetic recording medium of Example 4.

As shown in FIGS. 17 and 18, the saturation magnetic field Hs showed a minimum value in the case where the thickness of the magnetic coupling layer was about 1.5 nm. As the thickness of the magnetic coupling layer increased from 0 to 3 nm, the signal to noise ratio SoNR was improved by about 2.9 dB. By the combination of the writing assist layer having a relatively high saturation magnetization and a magnetic coupling layer of low saturation magnetization, the exchange coupling force in the perpendicular direction can be weakened effectively thereby enabling to improve the high signal to noise ratio at a thickness of the magnetic coupling layer exceeding 1 nm.

EXAMPLE 5

A magnetic disk was manufactured, and magnetic properties and writing/reading properties were measured by using the manufacturing steps and the evaluation method identical with those in Example 1. Table 7 lists the composition, the saturation magnetization Ms, and the thickness for each of the layers constituting the magnetic recording layer of the perpendicular magnetic recording medium manufactured in this example. As shown in Table 7, the perpendicular recording layer $6a$ had a composition of (Co—Cr (117 at %)-Pt (8 at %))-$SiO_2$ (8 mol %), the thickness of 13.5 nm, and a saturation magnetization Ms of 450 kA/m. The magnetic coupling layer $6b$ had a composition of Co—Cr (27 at %), and a saturation magnetization Ms of 200 kA/m. The writing assist layer $6c$ had a composition of Co—Cr (14 at %)-Pt (14 at %)-B (10 at %), a thickness of 5 nm, a saturation magnetization Ms of 420 kA/m. The writing assist layer $6c$ of this example had a relatively lower saturation magnetization Ms compared with Examples 1 to 4. The composition and the thickness for each of the layers other than those described above were identical with those in Example 1.

TABLE 7

| | Composition | Saturation magnetization MS (kA/m) | Thickness (nm) |
| --- | --- | --- | --- |
| Writing assist layer | Co—Cr(14 at %))—Pt(14 at %)—B(10 at %) | 420 | 5 |
| Magnetic coupling layer | Co—Cr(27 at %) | 200 | 0-5 |
| Perpendicular recording layer | (Co—Cr(17 at %)—Pt(18 at %))—$SiO_2$(8 mol %) | 450 | 13.5 |

Figure 19:
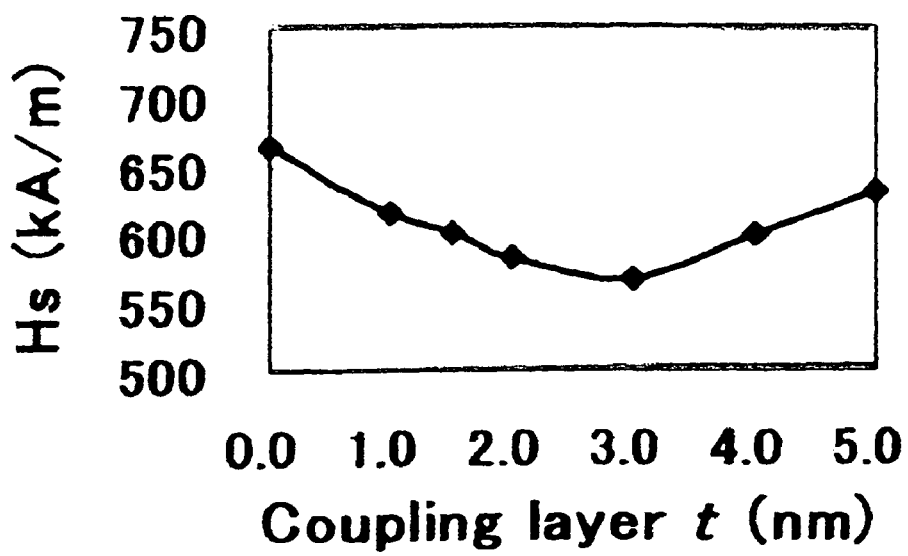
FIG. 19 is a view showing a relation between the thickness of a magnetic coupling layer and the saturation magnetic field Hs of a perpendicular magnetic recording medium of Example 5.
Figure 20:
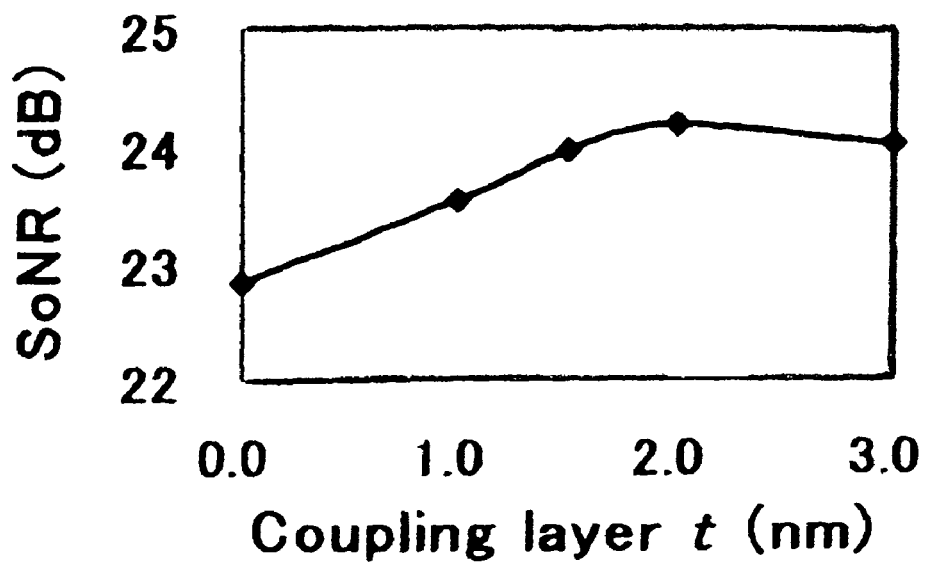
FIG. 20 is a view showing a relation between the thickness of a magnetic coupling layer and the signal to noise ratio SoNR of the perpendicular magnetic recording medium of Example 5.

As shown in FIGS. 19 and 20, the saturation magnetic field Hs showed a minimum value in the case where the thickness of the magnetic coupling layer was about 3 nm. In the case where the thickness of the magnetic coupling layer was about 2 nm, the signal to noise ratio SoNR was improved by about 1.4 dB.

EXAMPLE 6

A magnetic disk was manufactured, and magnetic properties and writing/reading properties were measured by using the manufacturing steps and the evaluation method identical with those in Example 1. Table 8 lists the composition, the saturation magnetization Ms, and the thickness for each of the layers constituting the magnetic recording layer of the perpendicular magnetic recording medium manufactured in this example. As shown in Table 8, the perpendicular recording layer $6a$ had a composition of (Co—Cr (17 at %)-Pt (18 at %))-$SiO_2$ (8 mol %), a thickness of 13.5 nm and a saturation magnetization Ms of 450 kA/m. The magnetic coupling layer $6b$ had a composition of Co—Cr (27 at %), and a saturation magnetization Ms of 200 kA/m. The writing assist layer $6c$ had a composition of Co—Cr (12 at %)-B (12 at %), the thickness of 4 nm and a saturation magnetization Ms of 520 kA/m. The writing assist layer $6c$ of this example does not contain Pt. The composition and the thickness for each of the layers other than those described above were identical with those in Example 1.

TABLE 8

| | Composition | Saturation magnetization MS (kA/m) | Thickness (nm) |
| --- | --- | --- | --- |
| Writing assist layer | Co—Cr(12 at %)—B(12 at %) | 520 | 4 |
| Magnetic coupling layer | Co—Cr(27 at %) | 200 | 0-5 |
| Perpendicular recording layer | (Co—Cr(17 at %)—Pt(18 at %)—$SiO_2$(8 mol %) | 450 | 13.5 |

Figure 21:
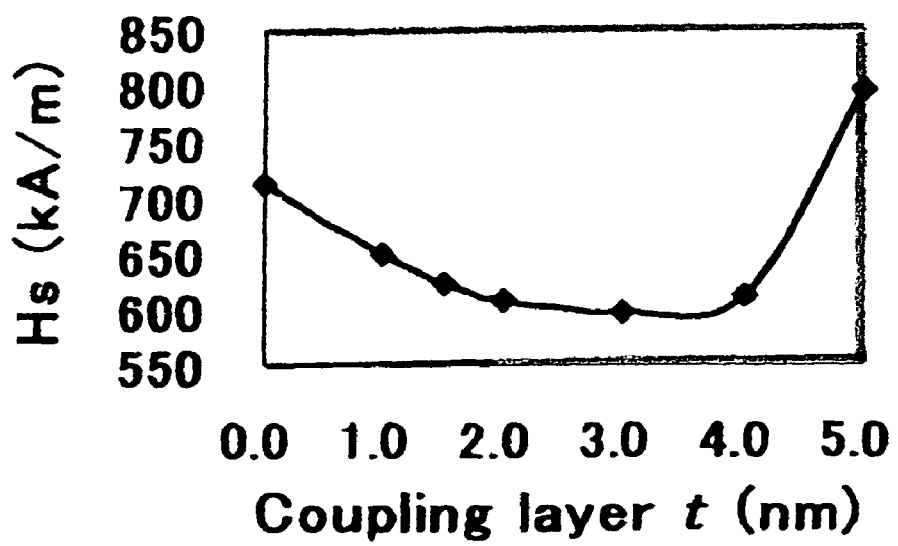
FIG. 21 is a view showing a relation between the thickness of a magnetic coupling layer and the saturation magnetic field Hs of a perpendicular magnetic recording medium of Example 6.
Figure 22:
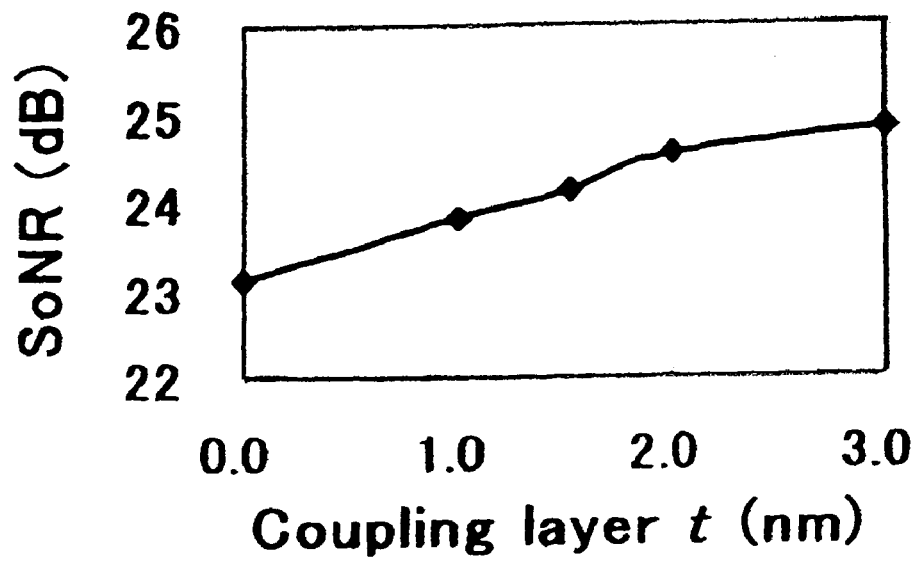
FIG. 22 is a view showing a relation between the thickness of a magnetic coupling layer and the signal to noise ratio SoNR of the perpendicular magnetic recording medium of Example 6.

As shown in FIGS. 21 and 22, the optimal thickness of the magnetic coupling layer is 3 nm or more and 4 nm or less. In the case of the thickness within the range described above, optimal perpendicular exchange coupling provides the minimum saturation magnetic field Hs. In the case where the thickness of the magnetic coupling layer was 3 nm, the signal to noise ratio SoNR was improved by 1.7 dB.

COMPARATIVE EXAMPLE 3

A magnetic disk was manufactured, and magnetic properties and writing/reading properties were measured by using the disk manufacturing steps and the evaluation method identical with those in Example 1. Table 9 lists the composition, the saturation magnetization Ms and the thickness for each of the layers constituting the magnetic recording layer of the perpendicular magnetic recording medium manufactured in this example. As shown in Table 9, the perpendicular recording layer 6a had a composition of (Co—Cr (17 at %)-Pt (18 at %))-SiO$_2$ (8 mol %), a thickness of 13 nm, and a saturation magnetization Ms of 450 kA/m. The magnetic coupling layer 6b had a composition of Co—Cr (24 at %), and a saturation magnetization Ms of 340 kA/m. The writing assist layer 6c had a composition of Co—Cr (12 at %)-Pt (18 at %)-B (10 at %), a thickness of 4.4 nm and a saturation magnetization Ms of 500 kA/m. The magnetic coupling layer 6b used in this comparative example had a higher saturation magnetization Ms than that of the magnetic coupling layer used in Examples 1 to 6.

TABLE 9

| | Composition | Saturation magnetization MS (kA/m) | Thickness (nm) |
|---|---|---|---|
| Writing assist layer | Co—Cr(12 at %)—Pt(18 at %)—B(10 at %) | 500 | 4.4 |
| Magnetic coupling layer | Co—Cr(24 at %) | 340 | 0-4 |
| Perpendicular recording layer | (Co—Cr(17 at %)—Pt(18 at %))—SiO$_2$(8 mol %) | 450 | 13 |

Figure 23:
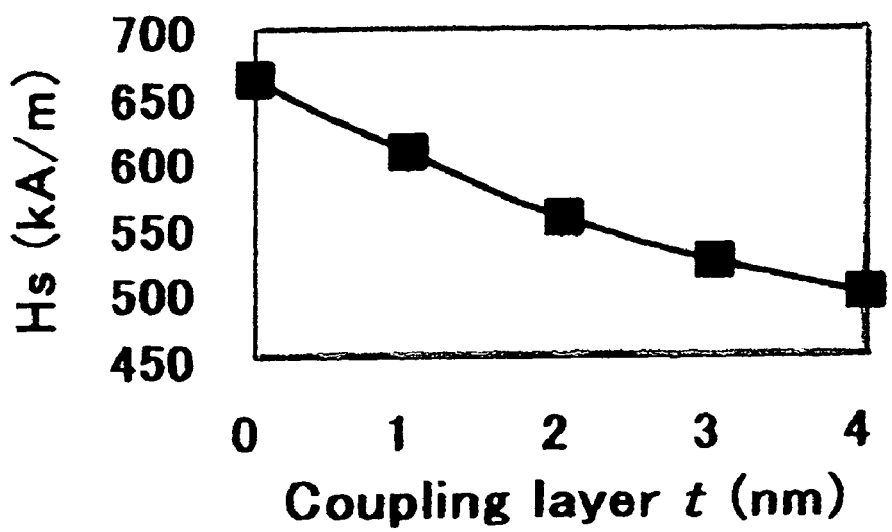
FIG. 23 is a view showing a relation between the thickness of a magnetic coupling layer and the saturation magnetic field Hs of a perpendicular magnetic recording medium of Comparative Example 3.
Figure 24:
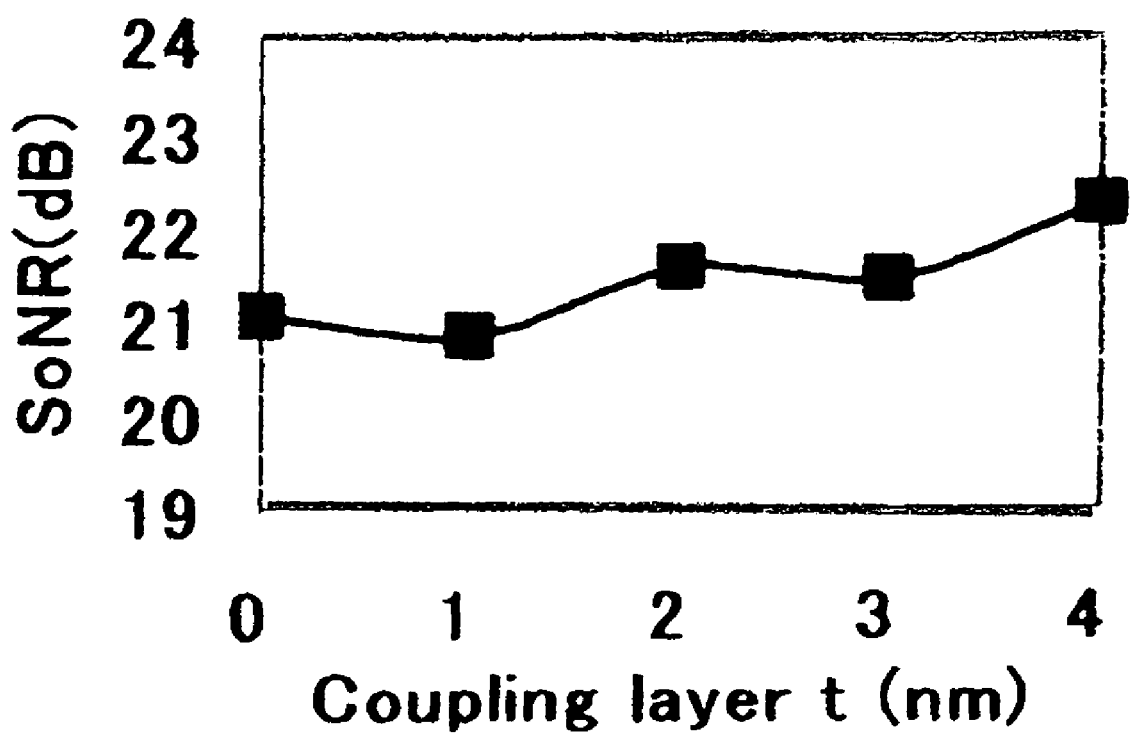
FIG. 24 is a view showing a relation between the thickness of a magnetic coupling layer and the signal to noise ratio SoNR of the perpendicular magnetic recording medium of Comparative Example 3.

As shown in FIGS. 23 and 24, as the thickness of the magnetic coupling layer increased to 4 nm, the saturation magnetic field Hs decreased and signal to noise ratio SoNR increased. The results shows that the optimal thickness of the magnetic coupling layer for providing the maximum exchange spring effect was 4 nm or more. However, at the thickness of the magnetic coupling layer of 4 nm, since the film thickness of the entire magnetic recording layer is excessively large, the recording resolution of the medium was lowered and although SoNR was improved by about 1 dB, the error rate could not be decreased. Accordingly, it is preferred to set the saturation magnetization Ms of the magnetic coupling layer to 300 kA/m or lower and the optimal thickness of the magnetic coupling layer to 3 nm or less.

EXAMPLE 7

A magnetic disk was manufactured, and magnetic properties and writing/reading properties were measured by using the manufacturing steps and the evaluation method identical with those in Example 1. The perpendicular recording layer 6a had a composition of (Co—Cr (16 at %)-Pt (18 at %))-SiO$_2$ (9 mol %) and a thickness of 12 nm. The writing assist layer 6c had a composition of Co—Cr (9 at %)-Pt (15 at %)-Mo (4 at %)-B (7 at %) and a thickness of 4.6 nm. 8 types of magnetic disks of specimens Nos. 1 to 8 formed with layers of compositions shown in Table 10 were manufactured each at a thickness of the magnetic coupling layer 6b of 2.5 nm. The composition and the thickness for each of the layers than those described above were identical with those in Example 1.

TABLE 10

| Specimen No. | Composition of magnetic coupling layer | −ΔHs (kA/m) | ΔSoNR (dB) |
|---|---|---|---|
| 1. | Co—Cr(24 at %)—Pt(6 at %) | 105 | 1.6 |
| 2. | Co—Cr(22 at %)—B(7 at %) | 110 | 1.8 |
| 3. | Co—Cr(22 at %)—Mo(5 at %) | 100 | 1.5 |
| 4. | Co—Cr(22 at %)—Ta(5 at %) | 115 | 1.6 |
| 5. | Co—Cr(22 at %)—V(5 at %) | 105 | 1.5 |
| 6. | Co—Cr(22 at %)—Nb(5 at %) | 100 | 1.6 |
| 7. | Co—Cr(22 at %)—Ru(5 at %) | 110 | 1.4 |
| 8. | Co—Cr(21 at %)—Ta(3 at %)—B(5 at %) | 95 | 1.5 |

The saturation magnetic field Hs of the magnetic disks were measured and a deviation ΔHs relative to the saturation magnetic field Hs0 of the magnetic disk not formed with the magnetic coupling layer that was manufactured for comparison (=Hs−Hs0) was evaluated. Further, also for the signal to noise ratio, the deviation ΔSoNR relative to the signal to noise ratio of the comparative magnetic disk not formed with the magnetic coupling layer was evaluated in the same manner. Table 10 shows the result of the evaluation. As seen in the table, ΔHs of the magnetic disks manufactured in this example is about −100 kA/m and each of them is more writable compared with the comparative magnetic disk. Further, each of them shows ΔSoNR of 1.4 dB or more and attains higher signal to noise ratio compared with the comparative magnetic disk.

EXAMPLE 8

A magnetic disk was manufactured, and magnetic properties and writing/reading properties were measured by using the manufacturing steps and the evaluation method identical with those in Example 1. The perpendicular recording layer 6a had a composition of (Co—Cr (16 at %)-Pt (18 at %))-SiO$_2$ (9 mol %) and a thickness of 12 nm. The writing assist layer 6c had a composition of Co—Cr (9 at %)-Pt (13 at %)-Mo (5 at %)-B (7 at %) and a thickness of 4.6 nm. 5 types of magnetic disks of specimen Nos. 9 to 13 formed with layers of compositions shown in Table II were manufactured each at a thickness of the magnetic coupling layer 6b of 2.5 nm. The composition and the thickness for each of the layers other than those described above were identical with those in Example 1.

TABLE 11

| Specimen No. | Composition of magnetic coupling layer | −ΔHs (kA/m) | ΔSoNR (dB) |
|---|---|---|---|
| 9. | (Co—Cr(25 at %)—SiO$_2$(4 mol %) | 105 | 1.6 |
| 10. | (Co—Cr(25 at %)—SiO$_2$(6 mol %) | 110 | 1.8 |
| 11. | (Co—Cr(20 at %)—Mo(5 at %)—SiO$_2$(6 mol %) | 100 | 1.5 |
| 12. | (Co—Cr(20 at %)—V(5 at %)—Ta$_2$O$_5$(6 mol %) | 115 | 1.6 |
| 13. | (Co—Cr(20 at %)—Nb(5 at %)—TiO$_2$(6 mol %) | 105 | 1.5 |

The saturation magnetic field Hs of the magnetic disks were measured and a deviation ΔHs relative to the saturation field Hs0 of the magnetic disk not formed with the magnetic coupling layer that was manufactured for comparison (=Hs−Hs0) was evaluated. Further, also for the signal to noise ratio, the deviation ΔSoNR relative to the signal to noise ratio of comparative magnetic disk not formed with the magnetic coupling layer was evaluated in the same manner. Table 11 shows the result of the evaluation. As seen in the table, ΔHs of the magnetic disks manufactured in this example is about −100 kA/m and each of them is more writable compared with the comparative magnetic disk. Further, each of them shows ΔSoNR of 1.5 dB or more and attains higher signal to noise ratio compared with the comparative magnetic disk.

What is claimed is:

1. A perpendicular magnetic recording medium comprising a substrate, a magnetic recording layer and a protective layer, wherein
the magnetic recording layer includes a perpendicular recording layer, a magnetic coupling layer and a writing assist layer;
the perpendicular recording layer is a Co alloy layer containing an oxide disposed between the magnetic coupling layer and the substrate;
the magnetic coupling layer is a ferromagnetic layer disposed between the perpendicular recording layer and the writing assist layer;
the writing assist layer is a ferromagnetic layer disposed between the magnetic coupling layer and the protective layer;
the saturation magnetization of the magnetic coupling layer is lower than the saturation magnetization of the perpendicular recording layer or the writing assist layer; and
the thickness of the magnetic coupling layer is 1 nm or more and 3 nm or less.

2. The perpendicular magnetic recording medium according to claim 1, wherein the saturation magnetization of the magnetic coupling layer is 300 kA/m or lower.

3. The perpendicular magnetic recording medium according to claim 1, wherein the magnetic coupling layer contains an oxide.

4. The perpendicular magnetic recording medium according to claim 3, wherein the oxide contained in the magnetic coupling layer is one of silicon oxide, tantalum oxide or titanium oxide, or a mixture thereof.

5. The perpendicular magnetic recording medium according to claim 1, wherein the concentration of the oxide contained in the writing assist layer is lower than the concentration of the oxide in the perpendicular recording layer, or the writing assist layer 4 does not contain the oxide.

6. The perpendicular magnetic recording medium according to claim 1, wherein the product of the saturation magnetization and the thickness of the magnetic coupling layer is less than the product of the saturation magnetization and the thickness of the perpendicular recording layer, and less than the product of the saturation magnetization and the thickness of the writing assist layer.

7. The perpendicular magnetic recording medium according to claim 1, wherein the perpendicular recording layer contains Co, Cr, Pt, and silicon oxide; the magnetic coupling layer contains Co and Cr; and the writing assist layer contains Co, Cr, Pt, and B.

8. The perpendicular magnetic recording medium according to claim 1, further comprising:
a soft magnetic underlayer having a first soft magnetic film and a second soft magnetic film anti-ferromagnetically coupled to each other and an interlayer disposed therebetween; and
an intermediate layer disposed between the soft magnetic underlayer and the magnetic recording layer.

9. A perpendicular magnetic recording medium including a substrate, a magnetic recording layer, and a protective layer, wherein
the magnetic recording layer includes a perpendicular recording layer, a magnetic coupling layer, and a writing assist layer;
the perpendicular recording layer is a Co alloy layer containing an oxide;
the magnetic coupling layer is a ferromagnetic layer disposed between the perpendicular recording layer and the writing assist layer;
the writing assist layer is a ferromagnetic layer comprising a Co alloy containing at least Cr and Pt,
the magnetic coupling layer is an alloy comprising Co and Cr as a main ingredient with the Co content of 70 at % or more and 75 at % or less; and
the thickness of the magnetic coupling layer is 1 nm or more and 3 nm or less.

10. The perpendicular magnetic recording medium according to claim 9, wherein the first element group is a group of elements comprising Pt, B, Mo, Ta, V, Nb, and Ru where the magnetic coupling layer contains at least one element selected from the first group in addition to Co and Cr, and the total for the content of at least one element is 10 at % or less.

11. The perpendicular magnetic recording medium according to claim 9, wherein the magnetic coupling layer contains an oxide.

12. The perpendicular magnetic recording medium according to claim 9, wherein the concentration of the oxide contained in the writing assist layer is lower than the concentration of the oxide in the perpendicular recording layer, or the writing assist layer does not contain the oxide.

13. The perpendicular magnetic recording medium according to claim 9, wherein the perpendicular recording layer contains silicon oxide, Co, Pt, and Cr, and the writing assist layer contains Co, Cr, Pt, and B.

14. The perpendicular magnetic recording medium according to claim 9, further including:
a soft magnetic underlayer containing a first soft magnetic film and a second soft magnetic film anti-ferromagnetically coupled with each other and an interlayer layer disposed therebetween; and
an intermediate layer disposed between the soft magnetic underlayer and the magnetic recording layer.

15. A hard disk drive comprising:
a magnetic head including a writing main pole, an auxiliary return pole, and a trailing shield; and
a perpendicular recording medium including a substrate, a magnetic recording layer and a protective, the magnetic recording layer having a perpendicular recording layer, a magnetic coupling layer and a writing assist layer, wherein
the perpendicular recording layer is a Co alloy layer containing an oxide;
the magnetic coupling layer is a ferromagnetic layer disposed between the perpendicular recording layer and the writing assist layer;
the writing assist layer is a ferromagnetic layer comprising a Co alloy containing at least Cr and Pt;
the saturation magnetization of the magnetic coupling layer is lower than the saturation magnetization of the perpendicular recording layer or the writing assist layer; and
the thickness of the magnetic coupling layer is 1 nm or more and 3 nm or less.

16. The hard disk drive according to claim 15, wherein the perpendicular recording layer contains Co, Cr, Pt, and silicon oxide; the magnetic coupling layer contains Co and Cr; and the writing assist layer contains Co, Cr, Pt, and B.

17. The hard disk drive according to claim 15, wherein the magnetic coupling layer contain an oxide.

18. The hard disk drive according to claim 15, further comprising:
- a soft magnetic underlayer containing a first soft magnetic film and a second soft magnetic film anti-ferromagnetically coupled with each other and an interlayer comprising Ru as a main ingredient disposed between them; and an intermediate layer disposed between the soft magnetic underlayer and the magnetic recording layer.

19. A hard disk drive comprising:
- a magnetic head including a writing main pole, an auxiliary return pole, and a trailing shield; and
- a perpendicular recording medium including a substrate, a magnetic recording layer and a protective, the magnetic recording layer having a perpendicular recording layer, a magnetic coupling layer and a writing assist layer, wherein
- the perpendicular recording layer is a Co alloy layer containing an oxide disposed between the magnetic coupling layer and the substrate;
- the magnetic coupling layer is a ferromagnetic layer disposed between the perpendicular recording layer and the writing assist layer;
- the writing assist layer is a ferromagnetic layer disposed between the magnetic coupling layer and the protective layer;
- the magnetic coupling layer is an alloy comprising Co and Cr as a main ingredient with the content of Co of about 70 at % or more and 75 at % or less; and
- the thickness of the magnetic coupling layer is 1 nm or more and 3 nm or less.

20. The hard disk drive according to claim 19 wherein when the first element group is a group of elements comprising Pt, B, Mo, Ta, V, Nb, and Ru, the magnetic coupling layer contains at least one element selected from the first group in addition to Co and Cr, and the total of the content of at least one of the elements is 10 at % or less.

21. The hard disk drive according to claim 19, wherein the perpendicular recording layer contains Co, Cr, Pt, and silicon oxide; the magnetic coupling layer contains Co and Cr; and the writing assist layer contains Co, Cr, Pt, and B.

22. The hard disk drive according to claim 19, wherein the magnetic coupling layer contains an oxide.

23. The hard disk drive according to claim 19, further comprising:
- a soft magnetic underlayer containing a first soft magnetic film and a second soft magnetic film anti-ferromagnetically coupled with each other and an interlayer comprising Ru as a main ingredient disposed between them; and an intermediate layer disposed between the soft magnetic underlayer and the magnetic recording layer.

\* \* \* \* \*

UNITED STATES PATENT AND TRADEMARK OFFICE
CERTIFICATE OF CORRECTION

| | | |
|---|---|---|
| PATENT NO. | : 8,000,060 B2 | |
| APPLICATION NO. | : 12/009415 | |
| DATED | : August 16, 2011 | |
| INVENTOR(S) | : Zhengang Zhang | |

It is certified that error appears in the above-identified patent and that said Letters Patent is hereby corrected as shown below:

In the specification:

Column 5, line 55 replace "stricture" with --structure--.

Signed and Sealed this
Eighteenth Day of October, 2011

David J. Kappos
*Director of the United States Patent and Trademark Office*